US00RE40961E

(19) United States
(12) Reissued Patent
Takimoto et al.

(10) Patent Number: US RE40,961 E
(45) Date of Reissued Patent: *Nov. 10, 2009

(54) COATING LAYER FORMING MACHINE AND METHOD OF FORMING IT

(75) Inventors: Kouichi Takimoto, Ibaraki (JP); Kiyoshi Yasuda, Ibaraki (JP); Masato Satoh, Ibaraki (JP)

(73) Assignee: NOK Kluber Co., Ltd., Tokyo (JP)

( * ) Notice: This patent is subject to a terminal disclaimer.

(21) Appl. No.: 11/117,775

(22) PCT Filed: Jan. 12, 2000

(86) PCT No.: PCT/JP00/00096

§ 371 (c)(1),
(2), (4) Date: Sep. 14, 2000

(87) PCT Pub. No.: WO00/41820

PCT Pub. Date: Jul. 20, 2000

Related U.S. Patent Documents

Reissue of:
(64) Patent No.: 6,555,162
Issued: Apr. 29, 2003
Appl. No.: 09/623,483
Filed: Sep. 14, 2000

(30) Foreign Application Priority Data

Jan. 14, 1999 (JP) ..... 11-007552

(51) Int. Cl.
*B05D 1/42* (2006.01)

(52) U.S. Cl. ..... 427/240; 427/356; 427/358; 118/52; 118/104; 118/107

(58) Field of Classification Search ..... 427/240, 427/356, 358; 118/52, 104, 107
See application file for complete search history.

(56) References Cited

U.S. PATENT DOCUMENTS

| | | | | |
|---|---|---|---|---|
| 3,038,441 | A | * | 6/1962 | Wamsley |
| 3,179,536 | A | * | 4/1965 | Martinek |
| 4,267,212 | A | * | 5/1981 | Sakawaki |
| 4,368,240 | A | * | 1/1983 | Nauta et al. |
| 4,425,866 | A | * | 1/1984 | Hoffmann |
| 4,889,073 | A | * | 12/1989 | Meinander |
| 4,934,310 | A | * | 6/1990 | Wohrle et al. |
| 5,328,735 | A | * | 7/1994 | Okazaki et al. |
| 5,384,162 | A | * | 1/1995 | Takahashi et al. |
| 6,841,196 | B2 | * | 1/2005 | Takimoto et al. ..... 427/240 |

FOREIGN PATENT DOCUMENTS

| | | | |
|---|---|---|---|
| JP | 2-95470 | * | 4/1990 |
| JP | 2-290277 | * | 11/1990 |
| JP | 3-242263 | * | 10/1991 |
| JP | 4-38463 | * | 6/1992 |
| JP | 8-173893 A | * | 7/1996 |
| JP | 08-173893 | * | 7/1996 |
| JP | 2530050 | * | 12/1996 |
| JP | 2534532 | * | 2/1997 |
| JP | 10-272411 A | * | 10/1998 |
| JP | 10-272411 | * | 10/1998 |

OTHER PUBLICATIONS

JPO computer of JP 08–173893 A, published Jul. 1996.*

* cited by examiner

*Primary Examiner*—Kirsten C Jolley
(74) *Attorney, Agent, or Firm*—Jacobson Holman PLLC

(57) ABSTRACT

A coating layer forming apparatus for minimizing the amount of the coating solution when forming a coating layer on a part and enhancing a dimensional precision of a formed surface of the coating layer. The coating layer forming apparatus has a rotation supporting device, a feeder (15), a layer former, and a coating removing device, maintains the inclined angle of a coating former for forming the coating layer at 30 to 70 degrees with respect to a tangential direction of rotation of a coating of a coating surface, and removes excess coating solution deposited on the coating former by a coating removing device.

43 Claims, 20 Drawing Sheets

FIG. 21

[Description of References]

1... coating layer forming apparatus

2... rotating support device

3... support table

4... one support

4A... other support

4b... rotationally movement member

5... positioner

6... end surface

6A... end surface

7... rotation drive

8... guide rail

9... moving means (air cylinder)

10... elongated hole

11... third drive

12... fourth drive

13... shaft

14... fifth drive

15... feeder

15A... immersion bath

16... nozzle

17... solenoid valve (operation valve)

18... flange

19... rotation body

20... layer forming device

20A... rotating layer forming device

FIG. 22

21... coating former

21a... second coating former

22... guide

23... first drive

24... frame

25... second drive

26... outlet

27... inclined surface

28... mount

29... clearance

30... coating removing means

30A... washing tank

30B... coating removing means

31... coating removing tool

32... jet nozzle

33... sixth drive

34... recess

35... layer former

36... inclined surface

36A... stepped surface

37... holder

38... mounting hole

39... cylindrical body

40... controller

48... supply pipe

49... level sensor

FIG. 23

50... coating tank

51... air tank

52... pipe

53... tube

100... coating device

101... coating container

102... coating solution

103... shaft bearing support plate

104... base material

105... coating surface

106... blade

107... block

108... solution receiving mechanism

110... spraygun

111... rotation mount

A... part

B... coating solution

C... coating layer

C'... coating layer after completion of baking (coating film)

D... coating surface

E... excess coating solution

F... centering hole

θ... inclined angle

P... tangential direction

COATING LAYER FORMING MACHINE AND METHOD OF FORMING IT

Matter enclosed in heavy brackets [ ] appears in the original patent but forms no part of this reissue specification; matter printed in italics indicates the additions made by reissue.

TECHNICAL FIELD

The present invention relates to a coating layer forming apparatus for forming a coating layer on a surface to be coated of a part and a method to form the coating layer.

More particularly, it relates to a coating layer forming apparatus for obtaining a coating layer improved in dimensional accuracy of a sliding surface and a lubricating effect of a sliding surface of a piston etc. and a method to form a coating layer.

BACKGROUND ART

Japanese Unexamined Patent Publication (Kokai) No. 8-173893 discloses a coating layer forming apparatus and a method to form a coated layer. An explanation will be given of the coating device disclosed in Japanese Unexamined Patent Publication (Kokai) No. 8-173893 with reference to FIG. 1.

A coating device 100 shown in FIG. 1 is provided with a coating container 101 above a base material 104. The coating container 101 is filled with a coating solution 102. Below the coating container 101 at the two ends of the base material 104 is arranged a shaft bearing support plate 103 for rotatably supporting the base material 104. The shaft bearing support plate 103 was mounted on it a not shown drive motor. The drive motor makes the base material 104 rotate in the illustrated clockwise arrow direction R.

Since the coating solution 102 flows out from a nozzle of the coating container 101, the coating surface 105 of the base material 104 made to rotate by the not illustrated drive motor is coated on its entire surface as if being wrapped by it along with the rotation. To level the thickness of coating solution 102 coated on the surface to be coated 105, a blade 106 set to an inclined angle θ of 135° with respect to a tangential direction of rotation of the base material 104 is provided at the surface to be coated 105.

A front end 106a of the blade 106 is held at a clearance of 100 μm from the coating surface 105. Further, the front end 106a of the blade 106 is formed into a stepped portion so as to become thinner. The blade 106 is fixed to a block 107. The excess amount of the coating solution 102 coated on the base material 104 is collected by the blade 106 and made to flow downward via an inclined surface of the blade 106 while the not shown drive motor makes the base material 104 rotate five to six times at 200 rpm. A solution receiving mechanism 108 for accommodating excess amount of the coating solution flowing down from a rear end of the blade 106 is provided.

The coating device 100 is simply structured and operates by a single principle, but suffers from the following disadvantages.

Since the coating solution 102 accommodated in the coating container 101 is made to drop from the nozzle of the coating container 101 on to the coating surface 105 of the rotating base material 104 by the free-fall dropping method, the amount dropped changes in accordance with the amount and viscosity of the coating solution 102 accommodated. Therefore, to prevent insufficient coating, a large amount of the coating solution 102 is made to drip on to the coating surface 105 of the substrate 104 and the excess amount of the coating solution is removed by the blade 106 and stored in the solution receiving mechanism 108, but the amount of the coating solution 102 consumed becomes large—which is uneconomical.

If a large amount of coating solution 102 is deposited on the coating surface 105 of the substrate 104, it cannot be fully removed by the blade 106, a coating of a uniform thickness cannot be formed, and it becomes difficult to improve the quality of the coating by reducing the speed of the substrate 104. If the speed of the substrate 104 is increased, the time for forming the coating becomes longer and the productivity is lowered.

The blade 106 is attached inclined so as to guide the excess coating solution 102 to the solution receiving mechanism 108 along its surface, the blade 106 is inclined to a blunt angle θ=135° with the rotating coating surface 105 of the substrate 104. That is, the blade 106 only scrapes off the excess coating solution 10 of the surface of the coating surface 105 of the substrate 104. The coating solution 102, however, has viscosity, so the amount of coating solution removed by the blade 106 changes in accordance with its viscosity. The thickness of the remaining coating solution on the coating surface 105 also changes in accordance with the viscosity. In this way, the quality of the coating film has a large dependence on the viscosity.

As apparatuses other than the above coating layer forming apparatus, for example, Japanese Unexamined Patent Publication (Kokai) No. 10-26081 and Japanese Unexamined Patent Publication (Kokai) No. 5-147189 disclose a screen printing method to coat material on a piston or other members. In a screen printing apparatus, however, the thickness of coated layer of the coating material becomes thin. To form a coating layer obtaining a sufficient sliding function, repeated coating is necessary. Therefore, there are problems that multiple coating is required, the number of steps in the process is increased, an increase in the coating facilities becomes necessary, and that the process of production becomes expensive.

DISCLOSURE OF THE INVENTION

An object of the present invention is to provide a coating layer forming apparatus able to minimize the amount of the coating solution coated and to improve the accuracy of thickness of the coating layer formed by the coating solution and a method of formation thereof.

Another object of the present invention is to provide a coating layer forming apparatus able to improve the quality and the dimensional accuracy of the coated layer by a coating blade even if the coating accuracy for coating the coating solution on the coating surface of a part is insufficient and a method of formation thereof.

Still another object of the present invention is to provide a coating layer forming apparatus able to improve the accuracy of thickness and quality of the coated layer regardless of the viscosity of the coating solution and a method of formation thereof.

Still another object of the present invention is to provide a coating layer forming apparatus able to improve the production efficiency of the formation of the coating layer and minimize the amount of the coating solution used and a method of formation thereof. Further, an object of the present invention is to provide a coating layer forming apparatus able to simplify the configuration of the coating layer forming apparatus and a method of formation thereof.

The coating layer forming apparatus according to the first aspect of the present invention comprises; a support portion for supporting in attachable, detachable and alignmentable manner; two ends of a part on which a coating layer is to be formed; a rotatingly support device having a rotation drive portion for making said part supported by the support portion rotate, a feeder for feeding a coating solution to a surface to be coated of the part supported by the support portion; a layer forming device having a coating former inclined at an angle (θ) of 30° to 70° with respect to a tangential direction of rotation of said coating solution fed from the feeder to the coating surface and having a front end held at a clearance of a coating solution thickness from the coating surface; and a coating removing means for removing the amount of the coating solution deposited on the coating former of the layer forming device from the coating former.

The coating layer forming apparatus of the present invention explained above coats the coating solution coated on the coating surface by the layer forming device, while making the outer diameter of the coating layer uniform. At this time, even if the coating solution is coated nonuniformly on the coating surface, since the coating solution accumulated as the excess coating solution at the triangularly shaped space between the coating former and the coating surface of the part flows to the coating surface where it is insufficient, the coating layer is uniformly coated. Further, since the coating solution can be pressed to the coating surface by the coating former, the dimensional accuracy for the outer diameter of the coating layer is improved. Further, even if the coating solution of the coating surface coated from the feeder is not uniform, since the coating former levels the excess coating solution to make it uniform, it is possible to coat the coating solution in a ring shape via a feed nozzle and possible to form a high precision coating layer even if coating via an immersion tank filled with the coating solution is performed.

In the coating layer forming apparatus of the present invention, the coating removing means removes excess coating solution deposited on the coating former after the coating former of the layer forming apparatus forms the coating solution to the thickness of the coating layer.

As shown in this configuration, when the coating solution is deposited on the coating former, since the coating solution deposited on the coating former is removed by the coating removing means, the dimensional accuracy of the coating layer is improved and it is possible to prevent formation of projections on the surface of the coating layer. Further, it is possible to secure excess coating solution at the coating former during formation and press the coating solution, the dimensional accuracy and quality of the coating layer can be improved.

Further, in the coating layer forming apparatus of the present invention, the coating removing means is comprised of an outlet at the layer forming side of the coating former provided at the layer forming device.

In shown in this configuration, by directly forming the coating removing means at the coating former, the excess coating solution is flowed through the outlet, and thus it is possible to secure a substantially constant amount of the excess coating solution and coat it on the coating surface. Also, the excess coating solution is reduced in stages. Therefore, it is possible to finish the surface of the coating layer with a high accuracy.

Further, in the coated layer forming apparatus of the present invention, the layer forming device has a first coating former and an approximately parallel second coating former and has an outlet at the second coating former.

As shown in this configuration, by providing the second coating former provided with the outlet in addition to the first coating former, it is possible to form the coating solution in two stages to improve the accuracy of the coating layer. Further, when the excess coating solution becomes more than a certain amount in the first coating former, the first coating former is pulled back and solution is removed by the coating removing means. During this time, the second coating former forms the coating solution into a coating layer. By alternately removing the excess coating solution deposited onto the first and second coating formers in this way, it is possible to finish the surface of the coating layer with a high accuracy.

Further, the coating layer forming apparatus according to the second aspect of the present invention comprises; a support portion for supporting in attachable, detachable and alignmentable manner, two ends of a part on which a coating layer is to be formed; a rotatingly support device having a rotation drive portion for making said part supported by the supports rotate; a feeder portion for feeding a coating solution to a coating surface of the part supported by the rotating support device; a rotating layer forming device provided along a circumferential direction of a rotation body with a plurality of blade-shaped coating formers each inclined in an angular range of 30° to 70° with respect to a tangential direction of rotation of said coating solution fed from the feeder to the coating surface and formed at a clearance of the coating layer thickness from the coating surface; and a washing tank where the coating formers are washed below the rotating layer forming device, the rotation direction of the rotating layer forming device being opposite to that of the rotation of the part.

Since the coating layer forming apparatus provides the rotation body with the first, second, third, and further coating formers inclined and the coating former is configured so as to be washed in a washing tank, it is possible to finish the coating layer while either washing the coating solution deposited on the coating former or washing it at the end of each forming process. Therefore, it is possible to form a high precision coating layer.

Further, in the coating layer forming apparatus of the present invention, the rotating layer forming device successively intermittently rotates for each first forming step where the plurality of coating formers form said coating solution into the coating layer.

As seen in this configuration, when the coating former forms the coating layer and excess coating solution is deposited on the coating former, the layer forming device rotates and finishes the coating layer by the next coating former.

Further, in the coating layer forming apparatus according to the present invention, the rotation drive portion of the rotating support device makes the part rotate in a range of 5 to 200 rotations per minute in one forming step and makes the rotational speed larger before making the coating formers move away from the coating layer.

As in this configuration, when coating the coating solution on the coating surface, the part is rotated at a low rotational speed, while when forming and finishing the coating layer, it is rotated at a higher speed than the first low rotation and the coating former is pulled away from the coating layer surface so that projections are not formed on the surface of the coating layer.

The method of forming a coating layer of the present invention comprises centering and supporting two ends of a part and making a coating surface rotate by a rotating support device, coating a coating solution from a feeder on the coating surface, forming a coating layer by a coating former inclined at an inclined angle of 30° to 70° with respect to a tangential direction of rotation of the coating solution coated on the coating surface and held at a clearance of the coating layer thickness from the coating surface, removing the excess coating solution deposited on the coating former via a coating removing means, and forming a coating layer of a next forming step.

The method of forming a coating layer of the present invention arranges the coating former inclined in the range of 30° to 70° with respect to the rotating tangential direction of the coating solution to form the coating layer while interposing excess coating solution at the coating former and, when the excess coating solution is deposited more than necessary or when shifting to the next forming process, removes the coating former via the coating removing means and finishes the outer surface of the coating layer.

*A cylindrical part rotates at a first speed, lower than a second speed used when positioning the coating former, to coat a coating solution on a surface of the cylindrical part.*

In the method of forming a coating layer of the present invention, the coating solution has a viscosity of 100 CP to 20,000 CP at a coating temperature of 25° C. and a shear rate of 100 $S^{-1}$.

By doing this, it becomes possible to form a coating layer with a good surface precision by a coating solution having a broad range of viscosity.

The coating solution has an organic resin as a binder dissolved or dispersed in water or an organic solvent and a PTFE powder as a solid lubricant, including 10 to 100 parts by weight of PTFE powder based on 100 parts by weight of the binder.

By doing this, the PTFE powder provides an excellent lubricating effect and it becomes possible to form a coated layer with a good surface precision.

BRIEF DESCRIPTION OF THE DRAWINGS

FIG. 11A and FIG. 11B are views of a coating former of an embodiment of the present invention, wherein FIG. 11A is a plan view and FIG. 11B is a side elevation of FIG. 11A.

FIG. 12A and FIG. 12B are views of the coating former of another embodiment according to the present invention, wherein FIG. 12A is a plan view and FIG. 12B is a side elevation of FIG. 12A.

FIG. 15A to FIG. 15C are views of a coating layer forming apparatus according to a second embodiment of the present invention and a method of formation thereof, wherein FIG. 15A is a plan view of a coating removing means provided at the coating former of the second embodiment, FIG. 15B is a sectional view along the line H—H of FIG. 15A, and FIG. 15C is a side elevation of FIG. 15A.

BEST MODE FOR WORKING THE INVENTION

Embodiments of the coating layer forming apparatus and method of formation thereof of the present invention will be explained next with reference to the attached drawings.

First Embodiment

A first embodiment of the coating layer forming apparatus and method of formation thereof of the present invention will be explained with reference FIG. 2 to FIG. 14.

Figure 2:
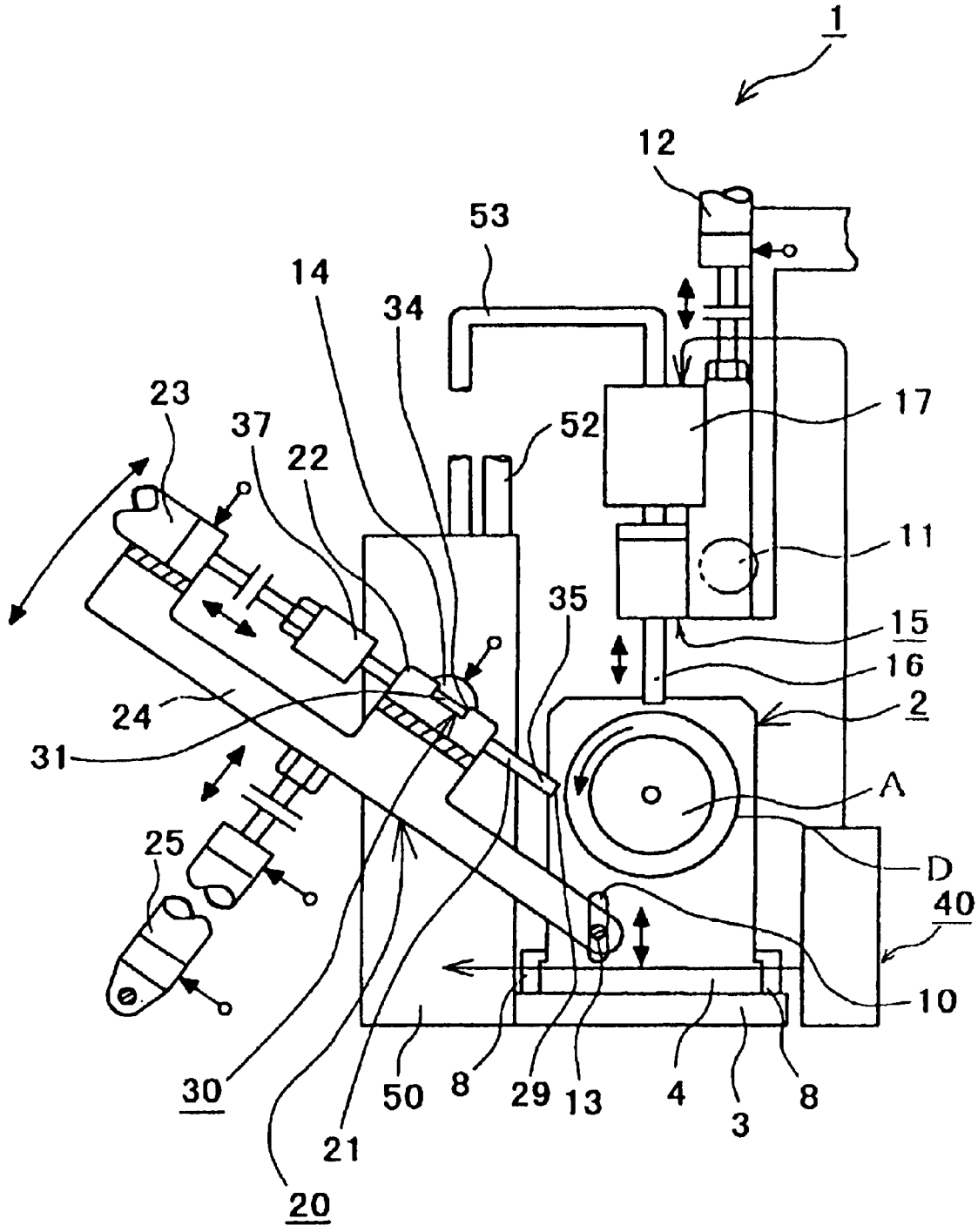
FIG. 2 is a sectional view along with the line H—H in FIG. 3 of a coating layer forming apparatus according to a first embodiment of the present invention.
Figure 3:
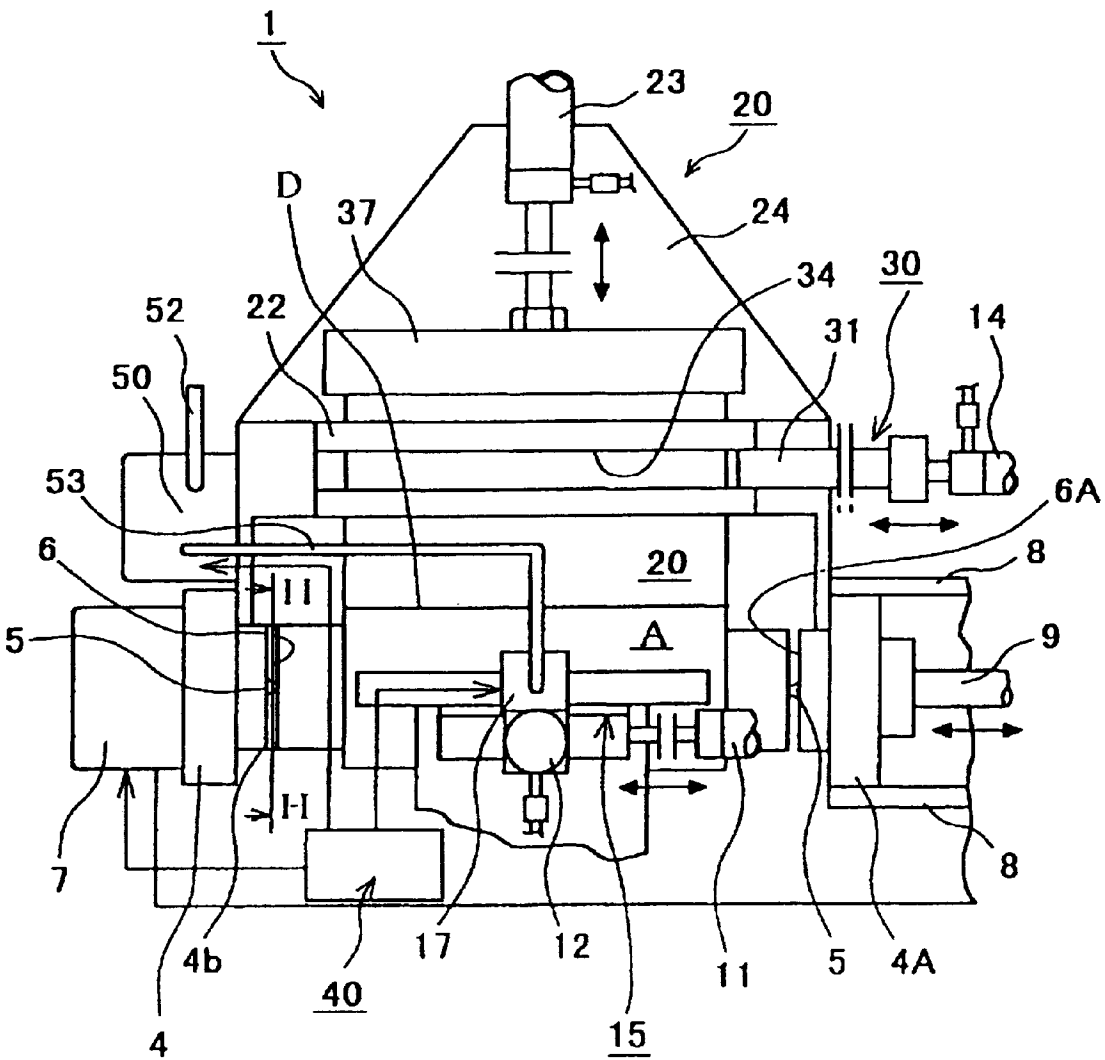
FIG. 3 is a plan view of the coating layer forming apparatus illustrated in FIG. 2.
Figure 4:
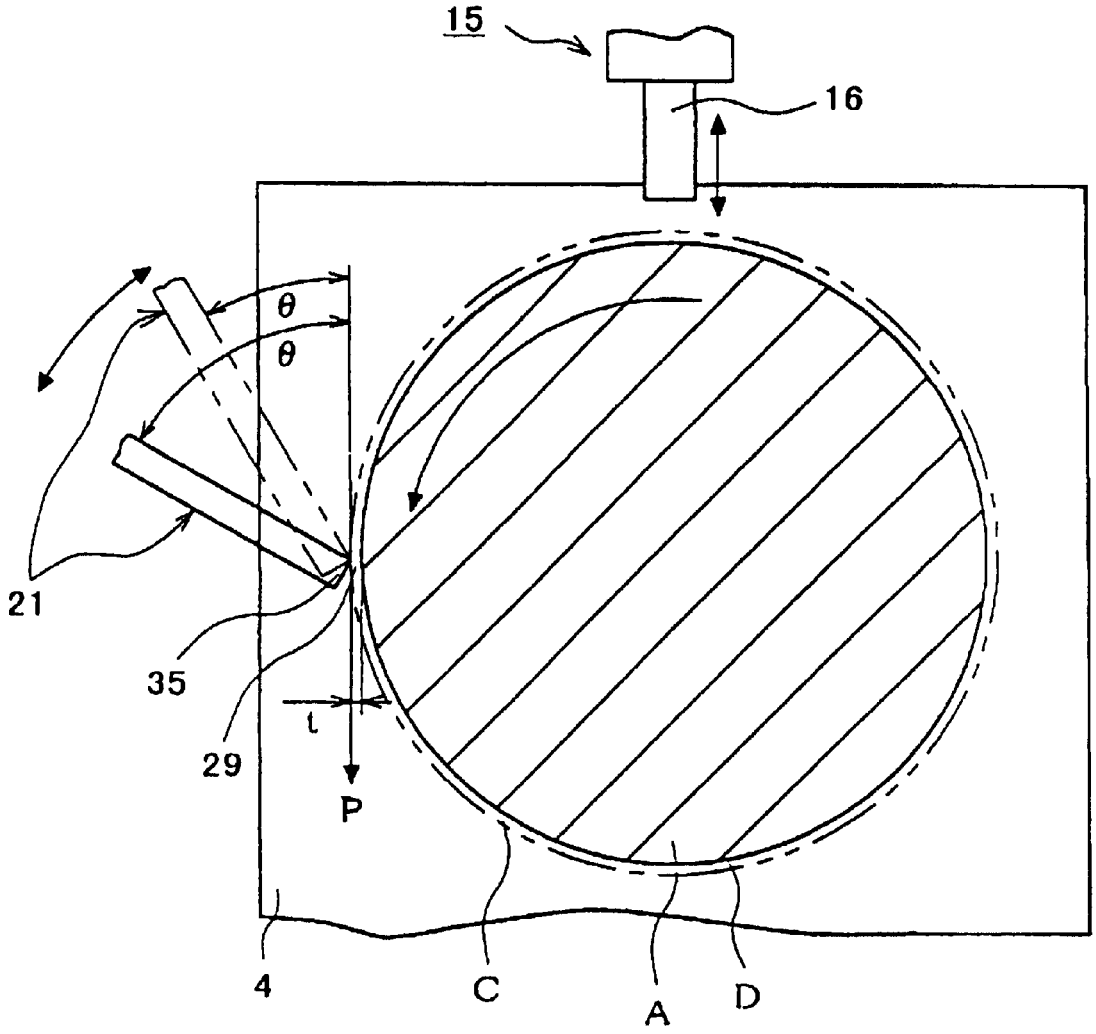
FIG. 4 is a side elevation of a coating former and a coating surface of a part according to the first embodiment of the present invention.
Figure 5:
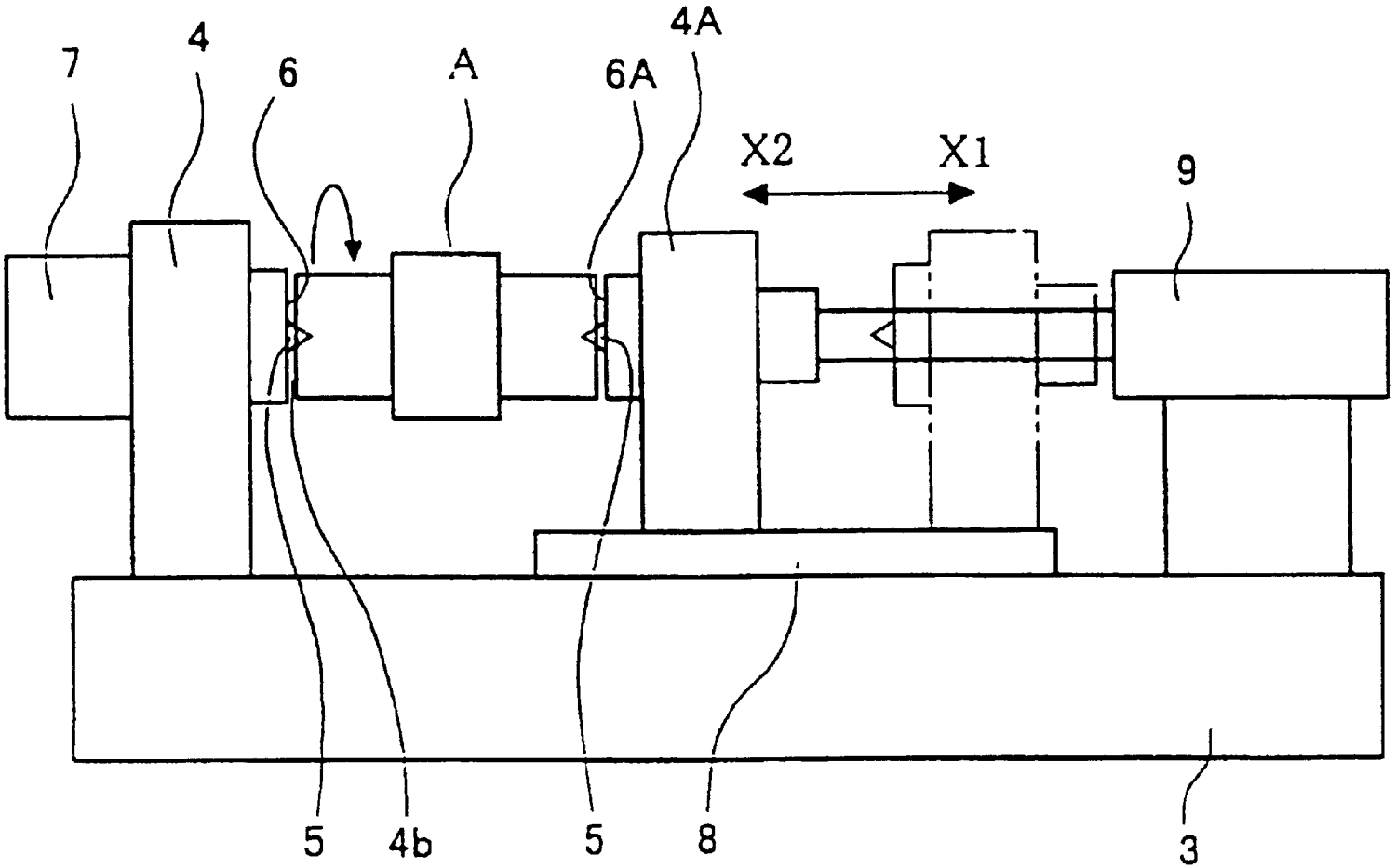
FIG. 5 is an enlarged front view of a rotating support device illustrated in FIG. 2.
Figure 6:
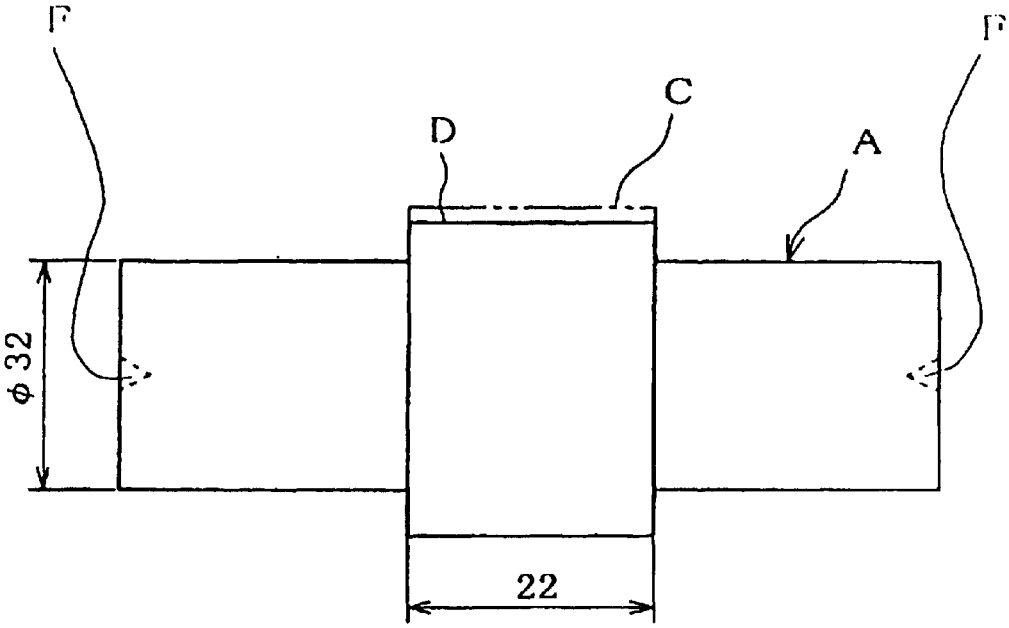
FIG. 6 is a front view of the part according to the first embodiment of the present invention.
Figure 7:
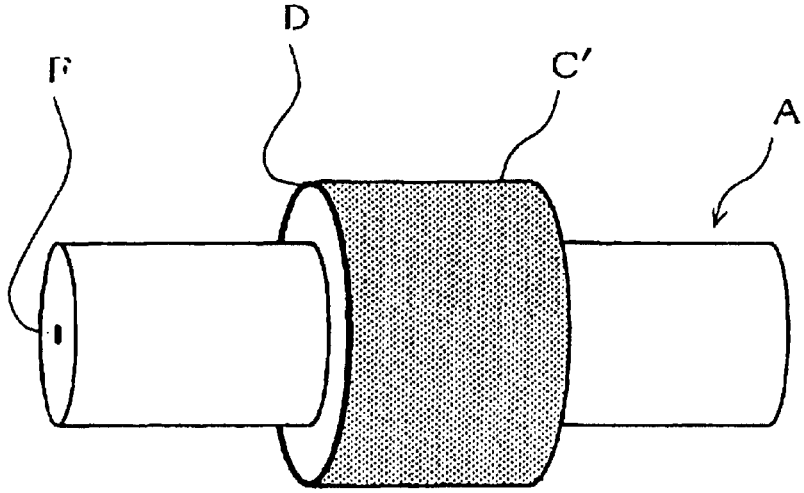
FIG. 7 is a front view of formation of the coating layer on the part illustrated in FIG. 6.

FIG. 2 and FIG. 3 show a coating layer forming apparatus of the first embodiment of the present invention. FIG. 2 is a side elevation of a coating layer forming apparatus along the line H—H in FIG. 3, while FIG. 3 is a plan view of FIG. 2. FIG. 4 is a view of the relationship of arrangement of the coating former 21 with respect to the coating surface D of a cylindrical part A as seen along the line H—H of FIG. 3. FIG. 5 is a front view of a rotating support device of FIG. 2. FIG. 6 is a front view of the cylindrical part of FIG. 5. FIG. 7 is a front view of the formation of the coated layer on the coating surface of the cylindrical part to be coated of FIG. 6.

The coating layer forming apparatus 1 illustrated in FIG. 2 and FIG. 3 is comprised, as main parts, of a rotating support device 2 for rotating the cylindrical part A, a feeder 15 for coating the coating solution B on the cylindrical part A, the layer forming device 20 for forming the coated layer C from the coating solution B, a coating solution removing means 30 for removing the coating solution B deposited on the coating former 21 as excess coating solution E when forming it on the coating surface D by the layer forming device 20, and a controller 40 for controlling these parts.

The rotating support device 2 is configured as shown in FIG. 5.

In FIG. 3 and FIG. 5, the cylindrical part A is formed as shown in FIG. 6. The cylindrical part A is a test piece a lubricating coating layer C' on a sliding surface of a piston. The coating layer C' is formed on the surface D of the test piece to be coated as shown in FIG. 6. The coating layer C' is formed as explained above, then is processed by subsequent processes of the present invention, that is, a drying process and a baking process. The material etc. of the coating layer C will be described later.

The cylindrical part A is provided at its two ends with conical centering holes. A positioner 5 of the rotating support device 2 is fitted into each centering hole F to position the mounting device of the cylindrical part A. Positioners 5 are provided at the two end surfaces 6, 6 A facing the supports 4, 4 A. Also, an end surface 6 of one support 4 is provided with a rotation member 4b for pressing against and rotating the part A. Further, the other support 4 is provided with a rotation drive 7, for instance, a motor, to make the positioner 4 and rotation member 4b rotate.

Also, the other support 4A is configured to be movable so as to be able to move horizontally by a movement means 9, that is, an air cylinder, via a guide rail 8 mounted on a support table 3. By using an air cylinder 9 to make the support 4A move in the X1 direction and open, setting the part A between the positioners 5, 5, and returning the support 4A in the X2 direction to close, the part A is easily mounted in the rotating support 2. After the coating layer C is formed on the surface D to be coated of the part A, the air cylinder 9 is used to open the supports 4, 4 A and take out the part A.

In FIG. 2 and FIG. 4, the coating former 21 is arranged at a position orthogonal to the axis of the cylindrical part A mounted in the supports 4, 4 A. The coating former 21 is slidably mounted via a guide 22 and can relatively move with respect to the cylindrical part A by a first drive 23 (for example, an air cylinder or a motor turning a screw thread). The guide 22 and the first drive 23 are fixed to a frame 24. The frame 24 is mounted at the support 4 via a shaft 13 so as to be rotatable. A second drive 25 comprised of an air cylinder or screw thread is designed to be moved or rotated to enable adjustment of the inclined angle θ of the coating former 21 with respect to the coating surface D of the cylindrical part A illustrated in FIG. 4. By this adjustment, the distance between the tip of the coating former 21 and the coating surface D can be adjusted.

The inclined angle θ is so designed that the direction of the coating former 21 with respect to the tangential direction of rotation P of the cylindrical part A can be accurately adjusted to an acute angle, for example, a range of 20°° to 80°. The inclined angle θ is preferably made within the range of 30° to 70°. The inclined angle θ is set corresponding to the viscosity etc. of the coating solution B within this range.

Further, the frame 24 is configured so as to be able to be finely adjusted in the vertical direction along an elongated hole 10 provided at the support 4.

Figure 14:
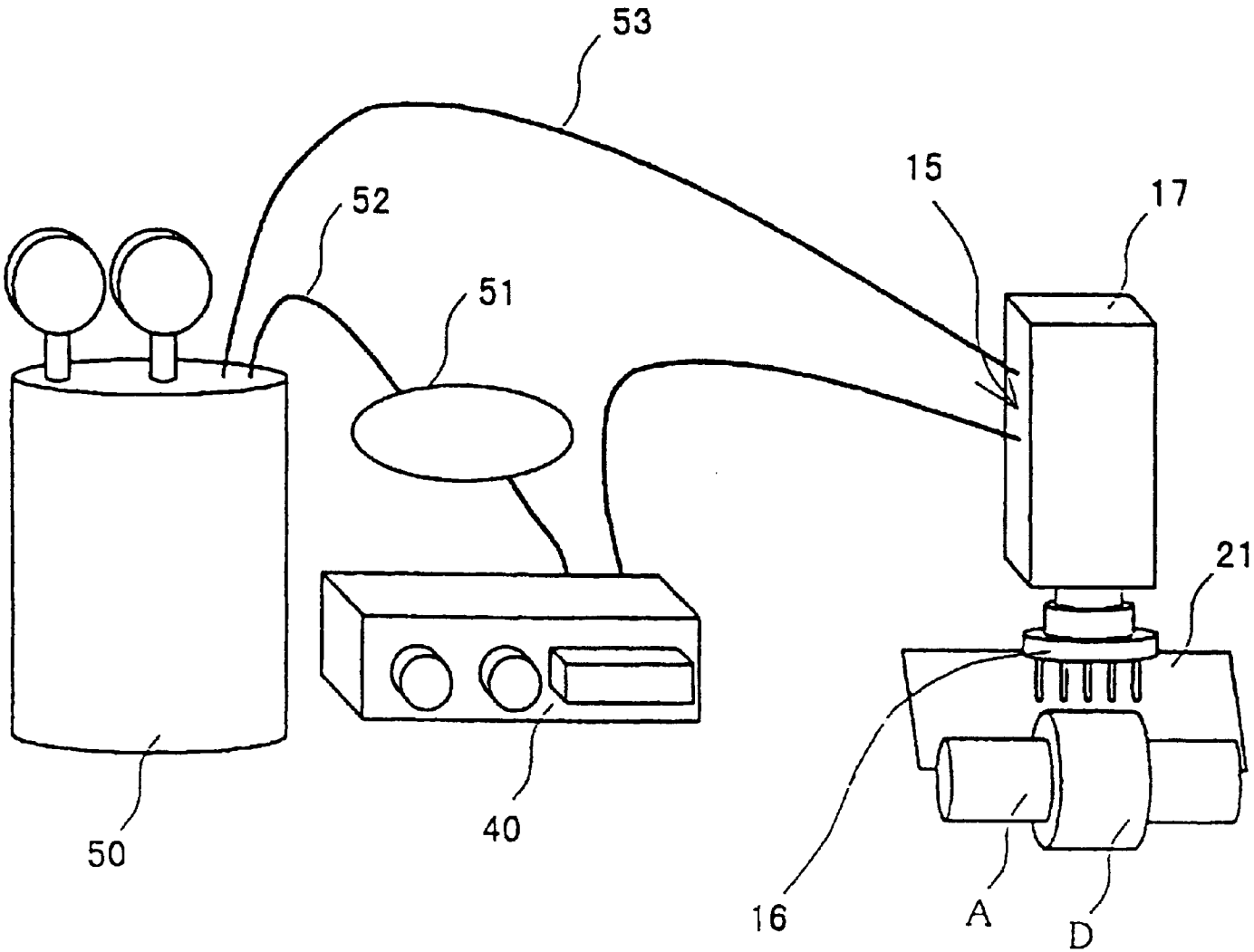
FIG. 14 is a view of the relation of a controller, a coating tank, and a feeder in FIG. 2.

The coating solution B to be shaped by the coating former 21 is coated from a nozzle 16 of the feeder 15 arranged above the coating surface D on the coating surface D. Also, a solenoid valve 17 is provided at the feeder 15. The coating solution B is filled and stored in a coating tank 50 as shown in FIG. 2, FIG. 3, and FIG. 14. The coating solution B in the coating tank 50 is delivered under pressure by compressed air introduced from an air tank 51 via a pipe 52 coupled with an air tank 51. The compressed coating solution B is supplied to the feeder 15 through a tube 53 connecting the coating tank 50 and the solenoid valve 17.

Figure 9:
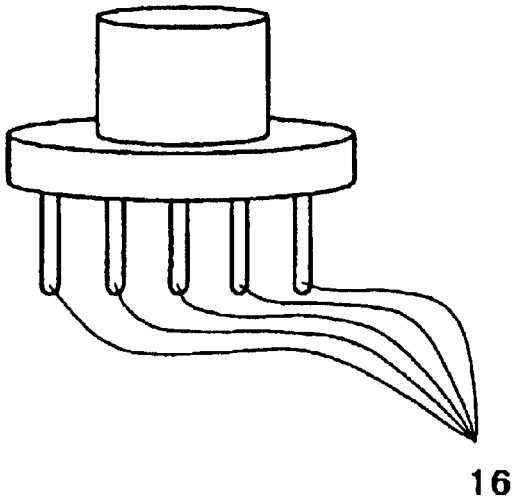

The coating solution B supplied to the feeder 15 is coated from the nozzle 16 by controlling the solenoid A valve 17 by a controller 40. At this time, the feeder 15 covers the coating surface D in the axial direction by the five nozzles 16 formed as shown in FIG. 9, so by rotating the coating surface D, the coating solution B is coated in five rings on the coating surface D. Further, when the width of the coating surface D in the axial direction is longer than the width of the nozzle 16 as a whole of the feeder 15, the feeder 15 is made to move in the axial direction of the part A by a third drive (air cylinder etc.) 11 to coat the coating surface D in a spiral manner. Also, the feeder 15 can be made to move by a fourth drive 12 so as to be able to move away from or approach the cylindrical part A.

Figure 8:
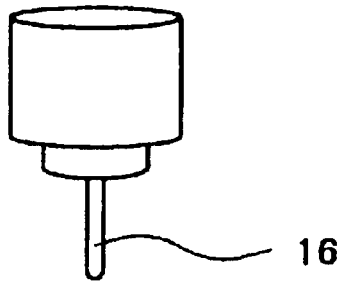
FIG. 8 to FIG. 10 are front views of nozzles of embodiments of the present invention.
Figure 10:
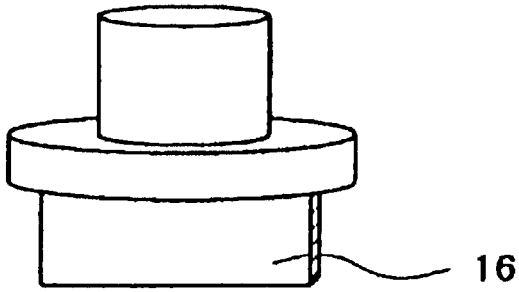

FIG. 8 is a front view of the nozzle supplying the coating solution of FIG. 2. FIG. 9 is a front view of a nozzle showing another embodiment of FIG. 8. FIG. 10 is a front view of a nozzle showing still another embodiment of FIG. 8.

The shape of the nozzle 16 is one shown in FIG. 8 to FIG. 10 in the present embodiment. In FIG. 8, there is one nozzle 16, so since the third drive 11 also makes the cylindrical part A rotate while moving the feeder 15 in the axial direction of the coating surface D, the coating solution B is coated spirally on the surface of the cylindrical part A. Also, if the coating solution B is coated without rotating the cylindrical part A, the coating solution B being coated linearly.

The nozzle of FIG. 9 is as explained above.

The nozzle 16 shown in FIG. 10 is formed to have a rectangular sectional shape and the outlet of the coating solution B is formed in a rectangular sectional shape, so the solution is coated in a strip over the entire coating surface D of the cylindrical part A. When the width of the outlet of the nozzle 16 is smaller than the width of the coating surface D, the solution is coated in a strip over the entire surface along with movement in the axial direction of the coating surface D by the third drive 11.

Figure 11A:
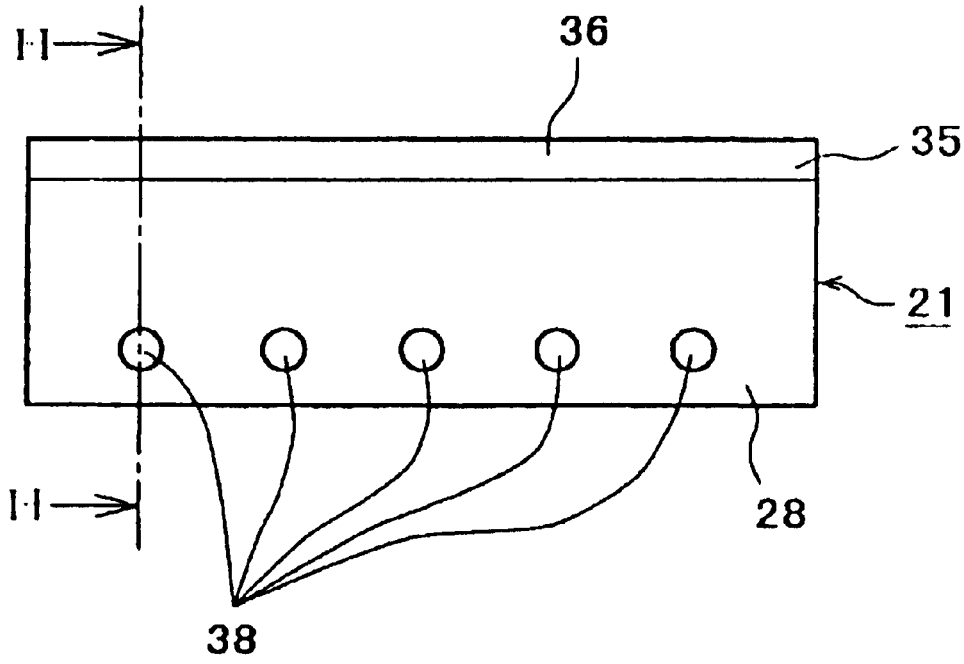
Figure 11B:
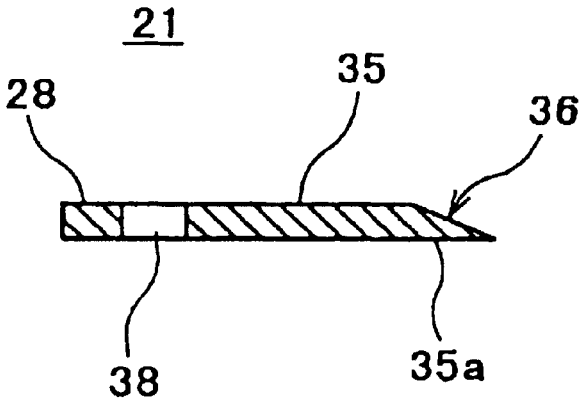
Figure 12A:
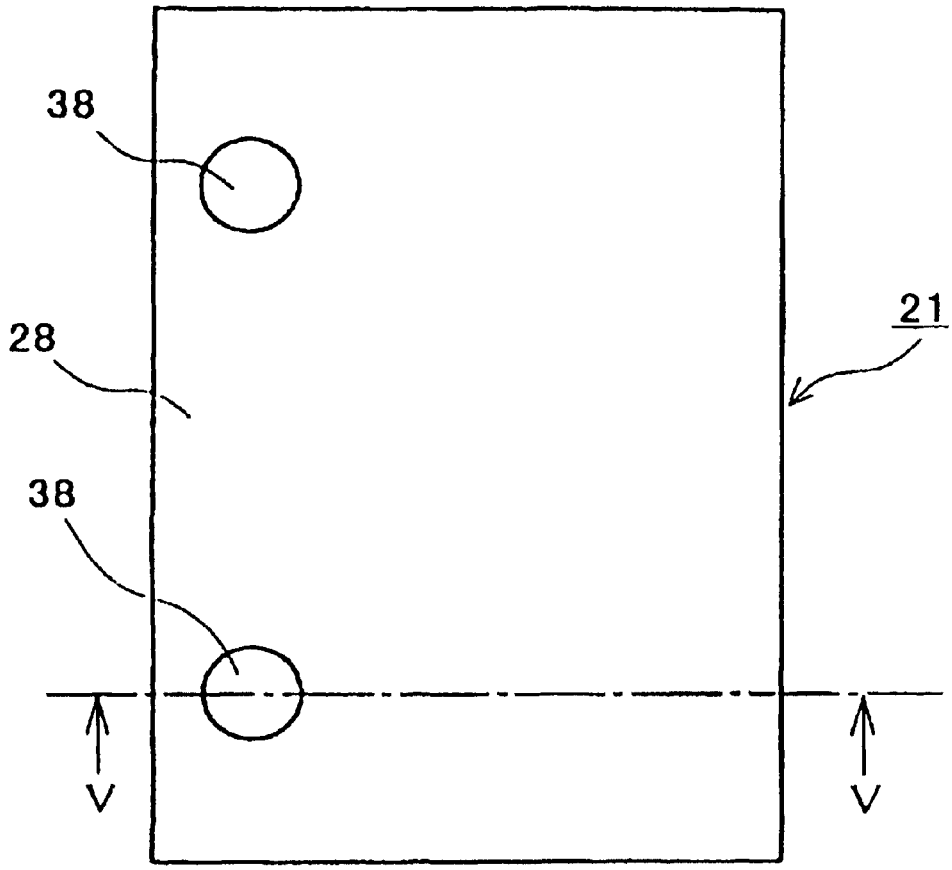
Figure 12B:
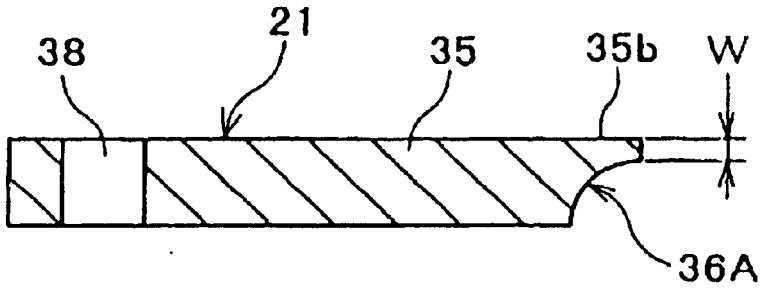

Preferable embodiments of the coating former 21 in the layer forming device 20 are shown in FIG. 11A and FIG. 11B and in FIG. 12A and FIG. 12B.

FIG. 11A is a plan view of a coating former, while FIG. 11B is a sectional side elevation along the line H—H of FIG. 11A. FIG. 12A is a plan view of a coating former of another embodiment of the coating forming device illustrated in FIG. 11B, while FIG. 12B is a sectional side elevation along the line V—V of FIG. 12A.

The coating former 21 illustrated in FIG. 11A and FIG. 11B is comprised of a layer former 35, front end 35a formed at the front end of the layer former 35 in the form of a wedge by an inclined surface 36, and mounting holes 38 through which screws for fastening this coating former 21 to the layer former 35 via a mount 28 pass. By arranging the front end 35a close to the coating layer D of the cylindrical part A, the thickness of the coating coated on the coated layer D is made uniform. The inclined surface 36 is located at the side where the cylindrical part A and the front end 35a face each other.

The coating former 21 illustrated in FIG. 12A and FIG. 12B has a layer former 35, a front end 35b cut away at the front end of the layer former 35 by a arc-shaped cross-section 36 A, and mounted holes 38. The arc-shaped cross-section 36 A is located at a back side where the cylindrical part A and the front end 35a face each other. The width W of the front end 35b and the arc-shaped cross-section 36a prevent waviness in the coating layer formed on the coating surface D of the cylindrical part A.

Figure 13:
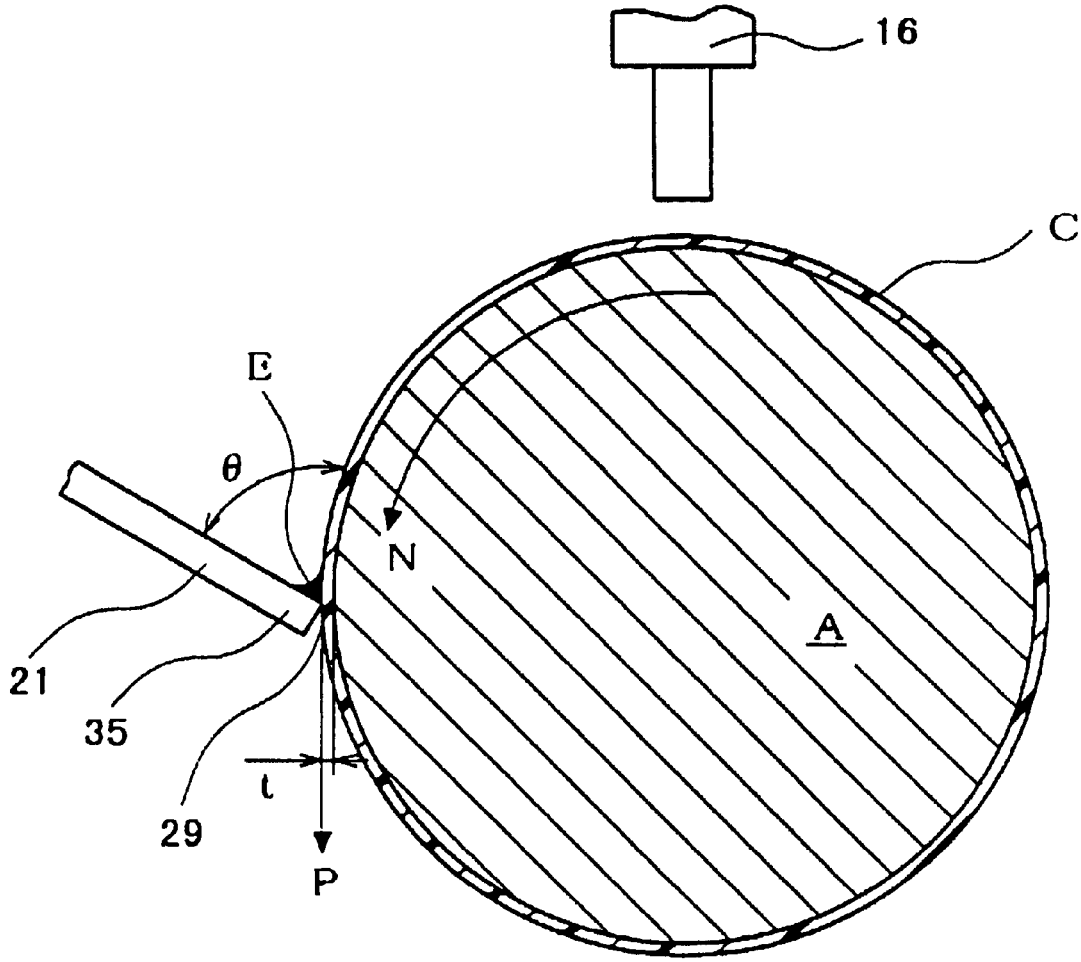
FIG. 13 is a sectional view of the coating layer formed on the part in the state shown in FIG. 13.

The coated coating solution B coated on the surface of the cylindrical part A is formed into the coating layer C by the coating former 21 as shown in FIG. 13. The thickness t of the coating layer C may be made within the range of 0.01 mm to 0.50 mm. Further, it was found by experiments that the preferable thickness of the coating layer C was from 0.02 mm to 0.30 mm. If the thickness of the coating layer C is more than 0.30 mm, a certain time for the drying process is required to prevent a foaming during drying or baking. Further, if the thickness t becomes more than 0.50 mm, the coating solution B will drip or the foaming will occur at the time of drying or baking and it becomes difficult to form the coating layer C' obtained after drying and baking to a uniform thickness.

If the lower limit of the thickness t of the coating layer C is less than 0.01 mm, if the cylindrical part A is used for a piston, the coating layer C' which is obtained after a drying or baking process' has shortage in a lubrication action.

The present invention has another object to obtain the coating layer having lubricating effect C' after completion of baking as the coating surface D when using the cylindrical part A as a piston.

Note that the thickness of the coating layer can be adjusted by for example vertically adjusting the frame 24 along an elongated hole provided in the support 4 to adjust the distance between the surface of the cylindrical part A and the front end of the coating former 21 and adjusting the inclined angle θ of the coating former 21 according to the viscosity of the coating solution.

The coating former 21 for forming the coating layer C is configured to be adjustable to an inclined angle θ of 20° to 80° at the point of contact of the coating former 21 with respect to the tangential direction of rotation P of the coating surface D. If the inclined angle θ of the coating former 21 is made an angle smaller than 20°, the contact area with the coating solution B is increased and buildup increases a portion of the coating layer C. Also, if the inclined angle θ is more than 80°, the amount of the coating solution B scraped off by the coating former 21 is increased and it becomes necessary to supply an excess amount of the coating solution B. Therefore, the inclined angle θ of the coating former 21 preferable in terms of quality is 30° to 70°. If so, the dimensional accuracy of the coating layer C was improved.

It was also observed that good results were obtained if the cylindrical part A was rotated 30 to 200 revolutions per minute by the rotating support device 2. If the rotational speed is made less than 30 rpm, the buildup increases by an extreme amount on the surface of the coating layer C. Further, if the rotational speed is more than 200 rpm, bubbles are mixed into the coating layer C and the centrifugal force causes the coating solution B to spray off or become wavy and the surface of the coating layer C becomes nonuniform.

In FIG. 2 and FIG. 3, the coating removing means 30 moving reciprocally in a direction orthogonal to a direction of movement of the coating former 21 is provided. The coating removing means 30 is provided with a fifth driving portion (air cylinder) 14 for making a coating removing tool 31 reciprocally move guided along a recess 34 formed in a guide 22. The coating removing tool 31 is rectangularly formed and is coupled at its rear with the fifth drive 14. The front end is formed so as to slide on the upper surface of the coating former 21 and remove the excess amount of coating solution E.

The coating solution B of this embodiment used for the coating layer forming apparatus 1 is a heat curing type slidable coating. It is comprised of an organic base resin as a binder and PTFE powder as a solid lubricant dissolved or dispersed in water or an organic solvent and contains 10 to 100 parts by weight of PTFE powder with respect to 100 parts by weight of the binder. The coating solution B of this range is excellent as a lubrication coating layer.

The lubrication coating layer must have a wear resistant ability, sliding ability, and sealing ability. The above mentioned composition has three abilities. If the PTFE powder is contained in an amount less than 10 percent by weight, the sliding ability becomes insufficient. Further, if the PTFE powder is contained in an amount over 50 percent by weight, the strength of the coating layer C' after drying and baking is reduced.

As the organic resin of the binder, a polyamide resin, polyimide resin, polyamidimide resin, epoxy resin, silicone resin, polyphenylene sulfide resin, phenol resin, polyester resin, urethane resin, and the like was used. These may be used alone or in mixtures of two or more types. As another compounding agent, a rheology control powder is used to adjust the viscosity characteristic of the coating solution. Note that as the solid lubricant, in addition to PTFE powder, it is possible to use graphite and molybdenum disulfide, while as an additive, it is possible to use a pigment, antifoaming agent, surfactant or the like.

Also, the viscosity of the coating solution B is preferably in the range of 100 CP to 20,000 CP. More particularly, a range of 1000 CP to 10,000 CP is better. If less than 1000 CP, the coating solution B easily drips from the coating surface D and it is hard to make the coating layer C thick. Further, if over 10,000 CP, the leveling ability becomes poor, so to solve this, the coating time becomes longer and therefore the productivity is reduced.

Note that the viscosity characteristics are measured using a cone plate type rotary viscometer. The viscosity was measured at 25° C. and at a shear rate of $100S^{-1}$ (share rate).

FIG. 14 is a view showing the relation of connection of the controller, the coating tank, and the feeder illustrated in FIG. 2. The controller 40, air tank 51, solenoid valve (working valve) 17, feeder 15, coating former 21, nozzle 16, and coating tank 50 are connected as illustrated. Details of the constitution illustrated in FIG. 14 will be given later.

The method of forming the coating layer of an embodiment according to the present invention using the above coated layer forming apparatus will be explained next.

The cylindrical part A used for the piston as shown in FIG. 6 or FIG. 7 is produced by machining.

The cylindrical part A is set in the rotating support device 2 as shown in FIG. 5. In this setting, the other support 4A freely moving by the moving means 9 Is opened to attach the cylindrical part A to the rotating support device 2, and the other support 4A is closed (state of FIG. 5). At this time, the cylindrical part A is attached by the positioner 5 in a specific position. The state of attachment of this attached cylindrical part A in the coated layer forming apparatus 1 becomes as shown in FIG. 2. This is the attachment step.

Next, by instruction of the controller 40, as shown in FIG. 14, the air tank 51 and the solenoid valve (working valve) 17 act and the coating solution B is coated on the coating surface D of the cylindrical part A from the nozzle 16 of the feeder 15. Simultaneously, the rotation drive 7 rotates the cylindrical part A under the instruction of the controller 40. The cylindrical part A is made to rotate by transmission of the power of the rotation drive 7 to the cylindrical part A via the pivot member 4b. The rotations speed is within a range from 30 rpm to 200 rpm. The rotation changes between two speeds with a first speed of 50 rpm and a second speed of 100 rpm. The change in speed is done immediately before the separation of the coating former 21 of the layer forming device 20 from the coated layer C. This is the coating step of coating the coating solution B on the coating surface D of the cylindrical part A.

At the state where the coating solution B is coated on the surface to be coated D of the cylindrical part A, the coated layer C has an uneven surface, so the first drive 23 acts under the instruction of the controller 40 and makes the coating former 21 extend to the cylindrical part A. Then, the front end surface of the layer former 35 of the coating former 21 reduces the clearance 29 of the cylindrical part A with the coating surface D to a range of from 0.02 mm to 0.50 mm.

The coating solution B is formed on the coated layer C by the coating former 21 while the cylindrical part A is being rotated at 50 rpm in this state. In this embodiment, the clearance 29 between the coating former 21 and the coating surface D is held at 0.1 mm when forming the coated layer C. This step is the coated layer forming step. Note that the excess amount of the coating solution is removed from the coated layer C by the coating former 21.

Note that the coating former 21 is adjusted to inclined angle θ by the second drive 25. This inclined angle θ is adjusted within a range of from 20° to 80°, but in the present embodiment, it was set at 45θ. Further, the shaft 13 is moved along the elongated hole 10 by a not illustrated adjustment screw so as to finely adjust the position relationship (position in the Y-direction) between the layer former 35 of the coating former 21 and the coating surface D.

Next, the excess amount coating solution E is stored in the layer former 35 of the coating former 21 during the coated layer shaping step, but the larger the excess amount of coating solution E, the worse the precision of the circumferential surface of the coated layer C, therefore the excess coating solution E deposited on the coating former 21 is removed by the coating removing means 30 at the stage where the coating former 21 is retracted so as to improve the forming finishing work of the layer former 35 at the time of formation in the next formation step. This step is the coating removal step.

After going through such steps, the formation step of the coated layer C is completed. At the same time of the completion of this formation step, the cylindrical part A formed with the coated layer C is taken out of the rotating support device 2. This cylindrical part A formed with the coated layer C passes through the drying step and the baking step, whereby the formation step is completed. These drying step and the baking step can be carried out by various facilities. This is the final step.

Note that, as another embodiment, if the excess amount of the coating solution E deposited on the coating former 21 becomes larger than the set amount, it is also possible for a not illustrated sensor to make the first drive 23 operate to return the former to the guide 22 and have the amount of the solution removed by the coating removing means 30. The coating former 21 then again extends to form the coated layer C.

Second Embodiment

A second embodiment of the coating layer forming apparatus and method of formation thereof of the present invention will be explained next with reference to FIG. 15.

FIG. 15 shows a coating removing means 30B provided at the coating former 21 of a second embodiment of the present invention.

Figure 15A:
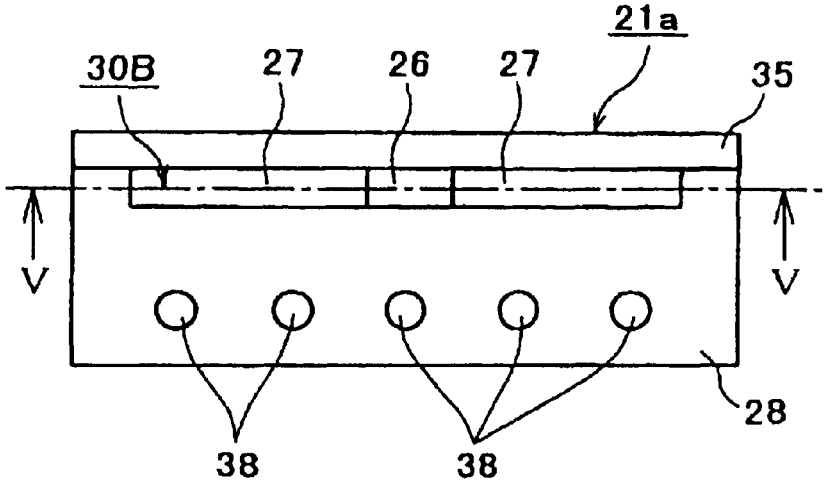
Figure 15B:
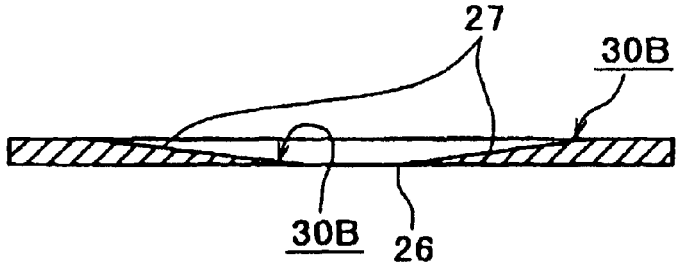
Figure 15C:
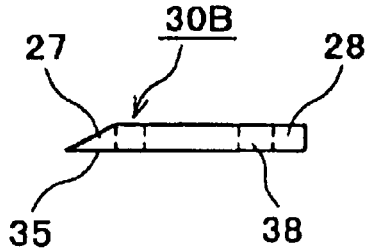

FIG. 15A is a plan view of the coating former 21 provided with the coating removing means 30B. FIG. 15B is a sectional view taken along the line V—V in FIG. 15A. FIG. 15C is a side elevation of the coating former 21 in FIG. 15A.

The coating former illustrated in FIG. 15A to FIG. 15C may be used as the second coating former 21 described later.

In FIG. 15A to FIG. 15C, the coating former 21 is formed in a blade shape, and the mounting portion 28 of the rear end is provided with mounting holes 38 for attaching to a holder 37 of the layer forming device 20. A layer former 35 is formed on the inclined surface at the front end opposite to the rear end. The rectangular outlet 26 is formed at the bottom surface in the recess formed in the inclined surface 27 from the two ends to the center at the layer former 35 side. The two sides of the inclined surface 27 are formed in stepped surfaces. The stepped surfaces may also be formed as steep inclined surfaces from the two sides. The coating removing means 30B may be an outlet 26 provided with a large number of holes.

The coating removing means 30B provided at the coating former 21 as described above is mounted to the holder 37 shown in FIG. 2. Further, when the coating solution B is formed into the coating layer C by the coating former 21, the excess amount of the coating solution E flows to the outlet 26 of the coating removing means 30B and is removed.

When providing the coating removing means 30B, the coating removing means 30 shown in FIG. 2 is unnecessary, but it is also possible to use the two. The rest of the configuration is similar to that of FIG. 2.

Third Embodiment

A third embodiment of the coating layer forming apparatus and method of formation thereof of the present invention will be explained next with reference to FIG. 16.

Figure 16:
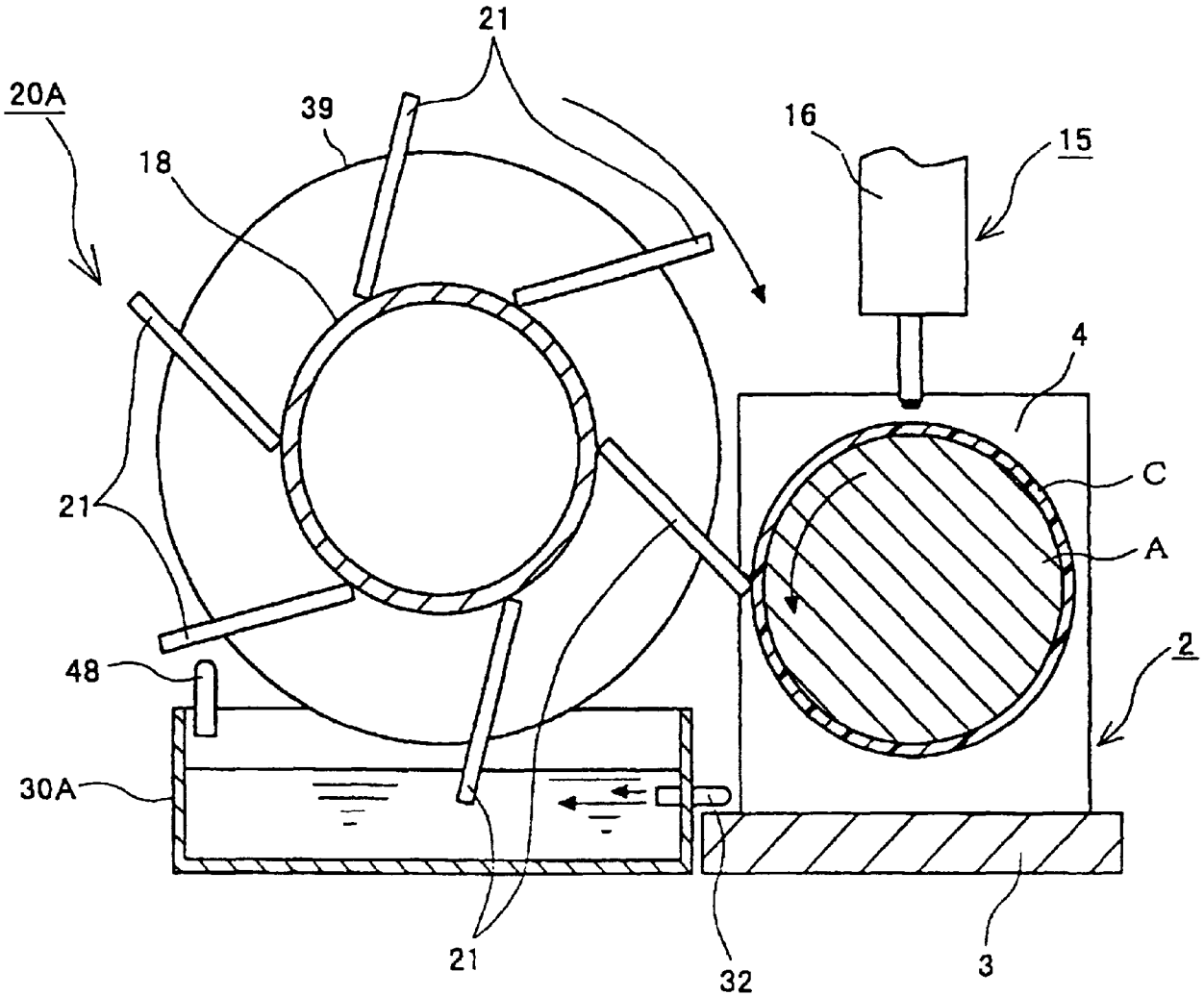
FIG. 16 is a sectional side elevation of a coating layer forming apparatus according to a third embodiment of the present invention.

FIG. 16 is a sectional side elevation of the coating layer forming apparatus 1 of a third embodiment of the present invention.

In FIG. 16, the point of difference from FIG. 2 is that the layer forming apparatus 20 is formed with functions corresponding to the rotating layer forming device 20A and that the excess amount of the coating solution E deposited on the contained former 21 of the rotating layer forming device 20A is washed off by solvent filled in the washing tank 30A. The washing tank 30A is provided with a jet nozzle 32. The solvent may be ejected from the jet nozzle 32 to strike and wash the layer former 35.

In the third embodiment, the layer forming device 20 explained above is the rotating layer forming device 20A. The rotating layer forming device 20A is structured with disk-shaped flanges 18 welded to the two ends of a cylindrical body 39 and with six blades welded equally arranged between the flanges 18. The six coating formers 21, that is, blades, may in accordance with need to be two, four, six, or eight formers.

In the rotating layer forming device 20A, each coating former 21 rotates once at the completion of each process for forming the coating layer C, but it is also possible to perform rough forming and fine forming by rotation of two coating formers 21 in one process. Further, it is also possible to rotate a plurality of formers in one process in accordance with need. These are then operated by instructions from a controller 40.

Further, the washing tank 30A corresponds to the coating removing means 30 in FIG. 2. The washing tank 30A is not illustrated, but is configured to be able to freely move to and from the rotating layer forming device 20A and designed to be able to adjust the depth of the washing solution. Note that reference numeral 48 denotes a supply pipe of the washing solution. The rest of the configuration is similar to that shown in FIG. 2.

Fourth Embodiment

A fourth embodiment of the coating layer forming apparatus and method of formation thereof of the present invention will be explained next with reference to FIG. 17.

Figure 17:
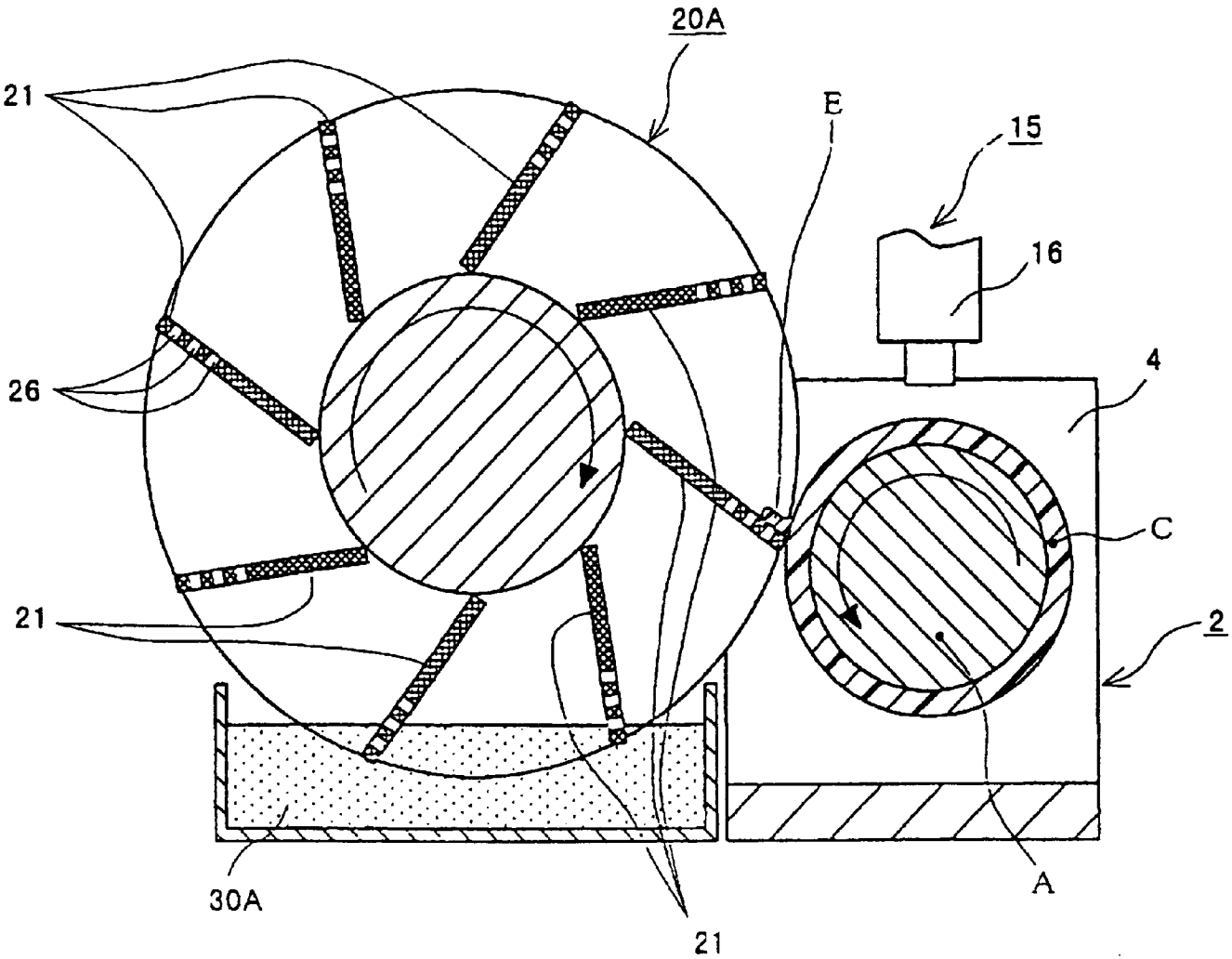
FIG. 17 is a sectional side elevation of a coating layer forming apparatus according to a fourth embodiment of the present invention.

FIG. 17 is a side elevation of the coating layer forming apparatus 1 of a fourth embodiment of the present invention.

In the coating layer forming apparatus 1 in the fourth embodiment illustrated in FIG. 17, the point of difference from the third embodiment is that a plurality of outlets 26 explained in the second embodiment (refer to FIG. 15) are provided at the blade shaped coating former 21. The washing effect in the washing tank 30A is improved by the outlets 26. The rest of the configuration is similar to the third embodiment.

Fifth Embodiment

A fifth embodiment of the coating layer forming apparatus and method of formation thereof of the present invention will be explained next with reference to FIG. 18.

Figure 18:
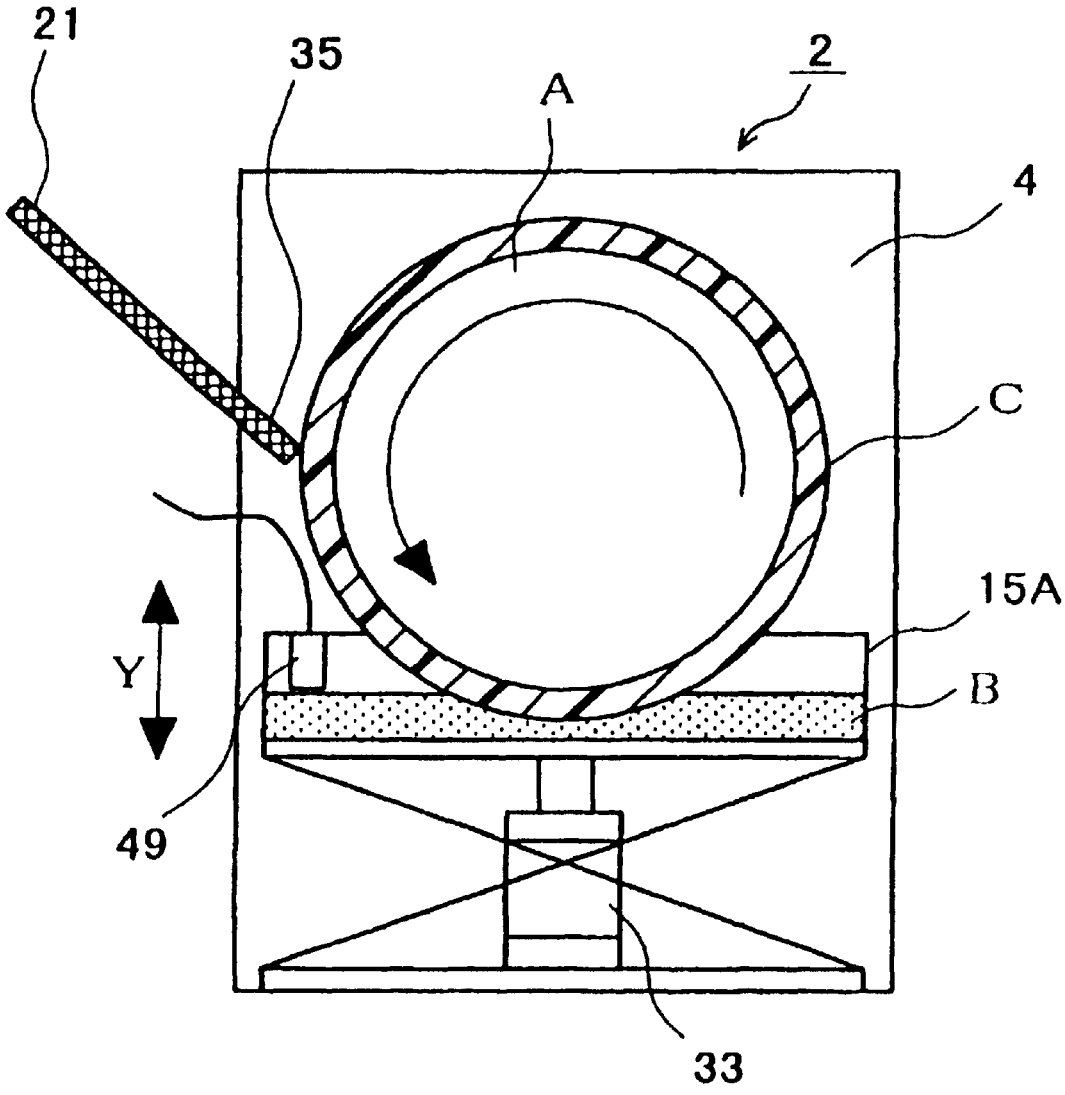
FIG. 18 is a sectional side elevation of a coating layer forming apparatus according to a fifth embodiment of the present embodiment.

FIG. 18 is a side elevation of the coating layer forming apparatus 1 of the fifth embodiment of the present invention.

Figure 1:
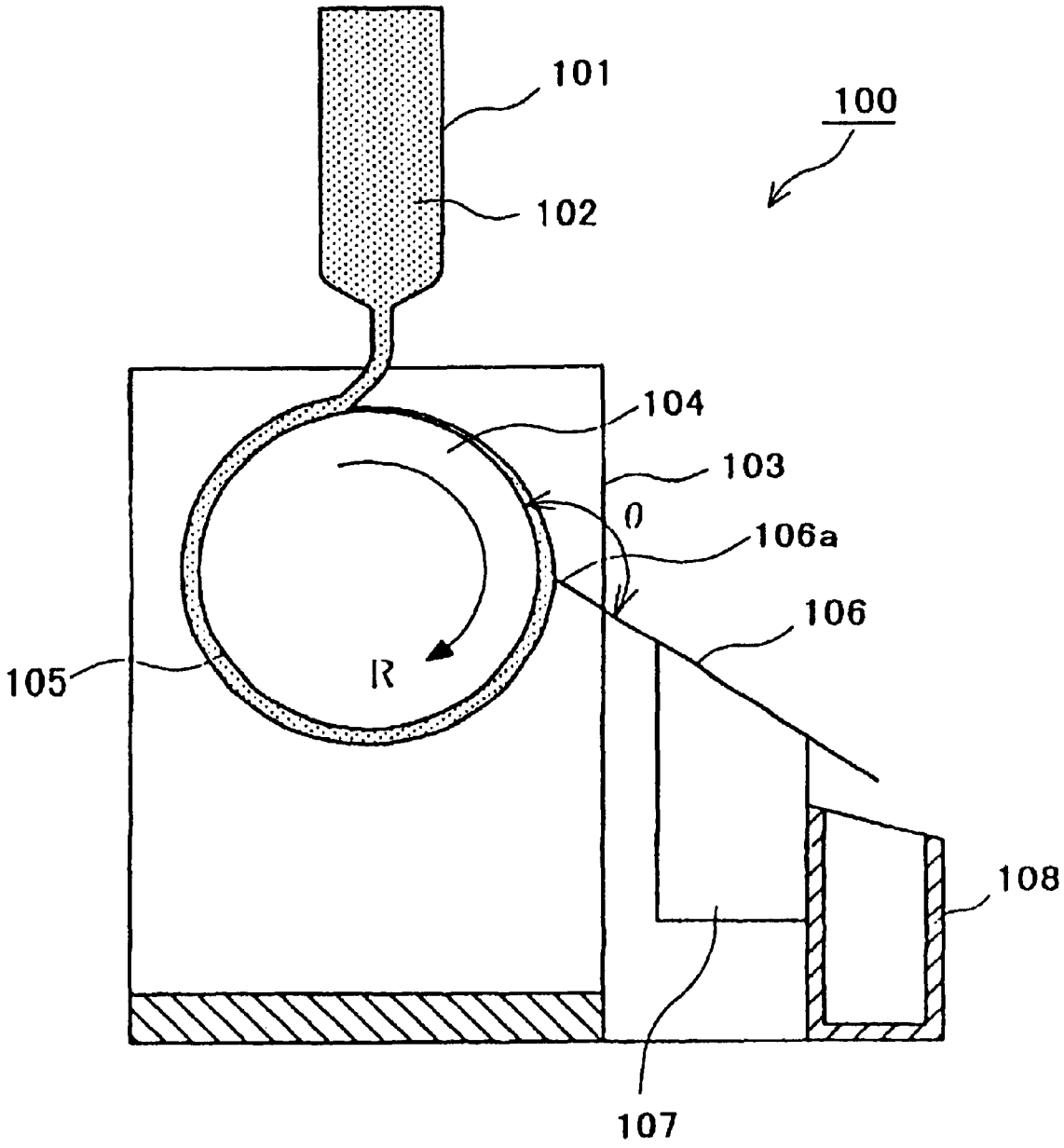
FIG. 1 (PRIOR ART)
FIG. 1 is a side elevation of a conventional coating layer forming apparatus.

In FIG. 18, the point of difference from the coating layer forming apparatus shown in FIG. 1 is that the feeder 15 is formed in an immersion tank 15A. The immersion tank 15A is filled with the coating solution B. The immersion tank 15A is arranged below the rotating support device 2. The cylindrical part A is coated on its coating surface D by rotation. The immersion tank 15A and the cylindrical part A are designed to be able to move to and from with each other relatively in the Y-direction. Movement in the Y-direction is performed by a sixth drive 33. A signal is transmitted to the controller 40 from a level sensor 49 provided within the immersion bath 15A. The sixth drive 33 is operated based on instructions issued from the controller 40 to the sixth drive 33. The rest of the configuration is similar to the coating layer forming apparatus 1 shown in FIG. 2. The amount of the coating solution is adjusted in accordance with the depth to which the cylindrical part A is immersed in the coating solution B.

Sixth Embodiment

A sixth embodiment of the coating layer forming apparatus and method of formation thereof of the present invention will be explained next with reference to FIG. 19.

Figure 19:
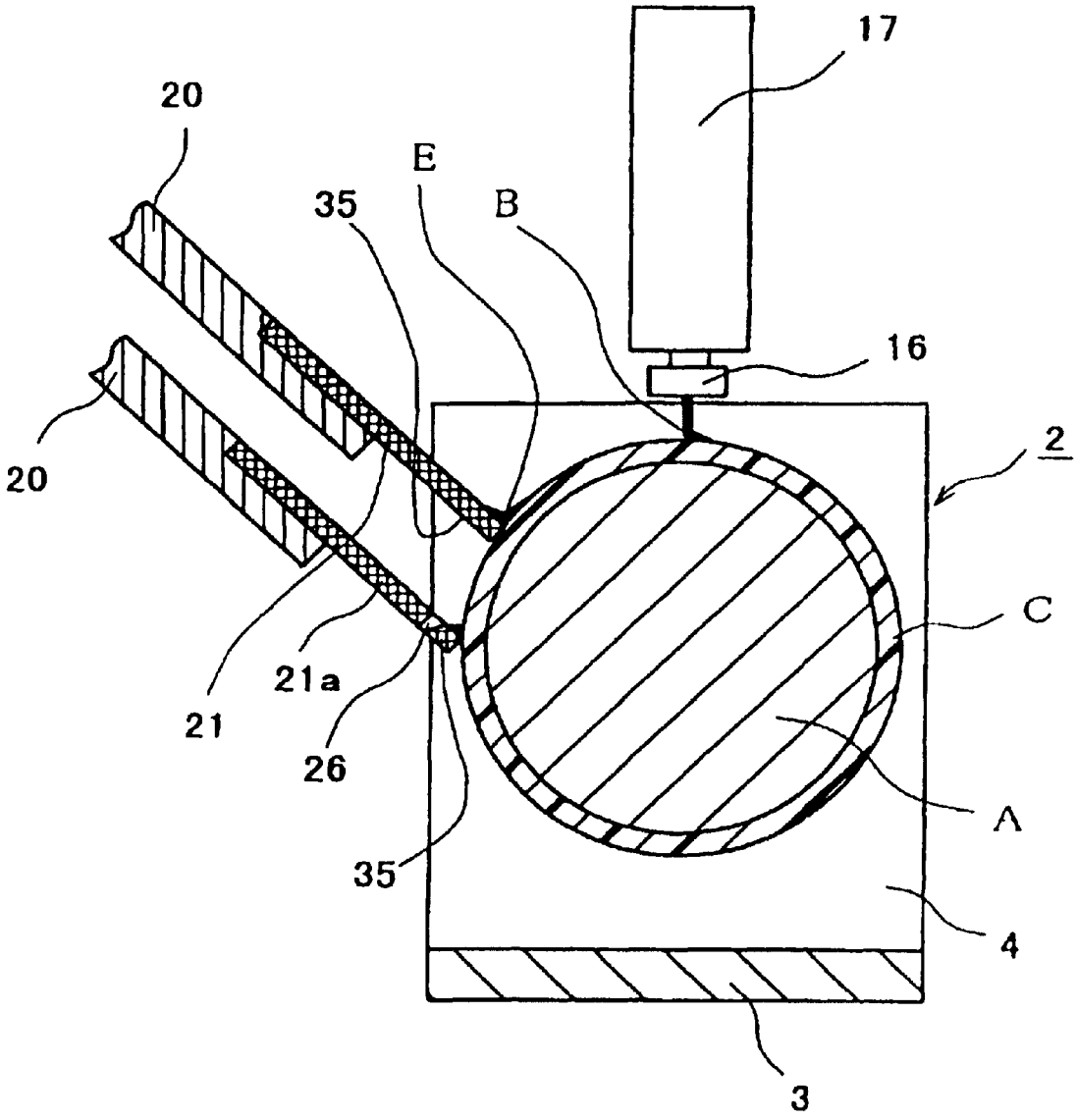
FIG. 19 is a sectional side elevation of a coating layer forming apparatus according to a sixth embodiment of the present invention.

FIG. 19 is a side elevation of the coating layer forming apparatus 1 of the sixth embodiment of the present invention.

In FIG. 19, the point of difference from the coating layer forming apparatus 1 in FIG. 2 is that the coating former of the layer forming device 20 is comprised of the first coating former 21 and the second coating former 21a. This configuration is a two-stage configuration as shown in FIG. 19.

The coating former is sometimes comprised of two first coating formers 21 arranged in parallel in two stages and sometimes comprised of the first coating former 21 and the second coating former 21a of the shape shown in FIG. 14 arranged in two stages.

When one process of formation of the coating layer C is performed in the state shown in FIG. 19, the first drive 23 coupled with the second coating former 21a is operated to make it retract during the formation of the coating layer C by the first coating former 21 and the excess amount of the coating solution E deposited on the layer former 35 is removed using the coating removing means 30. Next, the second coating former 21a is advanced to form the coating solution B into the coating layer C at a high precision. During that time, the first coating former 21 is retracted and the excess amount of the coating solution E is removed by the coating removing means 30. That is, the first coating former 21 and the second coating former 21a are alternately operated to form the coating layer C.

Specifically, providing the second coating former 21a as a second stage prevents generation of excess amount of the coating solution E and prevents projections from being caused due to buildup of the solution at the surface of the coating layer C.

Seventh Embodiment

Next, a seventh embodiment of the coating layer forming apparatus and method of formation thereof of the present invention will be explained.

In the coating layer forming apparatus 1 of the seventh embodiment of the present invention, in FIG. 3, the rotation drive 7 operates at a low speed at an initial stage of the formation of the coating layer C under instructions of the controller 40. Next, when the coating layer C is close to being finished, the speed is made higher than the initial one, the coating former 21 is retracted, and the process of formation of the coating layer C is completed. The high speed rotation prevents the projections from forming on the surface of the coating layer C due to buildup of the excess amount of the coating solution deposited on the coating former 21 and gives a high dimensional accuracy.

The two stages of rotation of the cylindrical part A in the seventh embodiment are obtained by controlling the rotation drive 7 by the controller 40. The two-stage rotation coating layer forming apparatus 1 can be employed in the first embodiment to the sixth embodiment. The rotational speeds may, as explained above, be ones in the range of from 30 rpm to 200 rpm. For example, the first rotational speed is made at 30 rpm and the second rotational speed is made at 100 rpm. Alternatively, the first rotational speed is made at 60 rpm and the second rotational speed is made at 150 rpm.

EXAMPLES

Next, examples will be explained.

The cylindrical part A of the examples is the one shown in FIG. 6. Also, the coating former 21 is the former shown in FIG. 11 and is used it as the first coating former 21 and the former shown in FIG. 15 is used as the second coating former 21a for two-stage formation in the state of the FIG. 19.

Example 1

The cylindrical part A shown in FIG. 6 was set in the coating layer forming apparatus 1 of the present invention. The coating solution B was successively coated in rings in one second at a time at three equal points equally arranged along the axial direction of the coating surface D using the nozzle 16 shown in FIG. 8 while rotating the cylindrical part A at a first rotational speed of 60 rpm.

Next, the inclined angle θ of the coating former 21 of the layer forming device 20 was made at 45° and the layer former 35 was held at a clearance 29 of 0.2 mm with respect to the coating surface D to form the coating layer C. After the coating solution B was coated, the rotational speed of the cylindrical part A was changed to 100 rpm and the coating former 21 was pulled away from the coating layer C. Next, the cylindrical part A was detached from the rotary support device 2 and dried and baked in an electric furnace under drying and baking conditions. It could be observed that a uniform coating layer C was formed on the cylindrical part A after the end of the baking. Note that the coating solution component after drying and baking included 30 wt % of PTFE powder and had a viscosity of 3000 CP.

Example 2

The same procedure was performed in Example 2 as with Example 1 except the points described below.

(1) The rotational speed of the cylindrical part A was made at 30 rpm.

(2) The nozzle 16 shown in FIG. 9 comprised of smaller nozzles arranged at five equal points equally arranged in the axial direction of the coating surface D of the cylindrical part A was used.

(3) The coating solution B was coated for 2 seconds from the nozzle 16 so as to form five rings on the coating surface D.

Example 3

The same procedure was performed in Example 3 as with Example 1 except the points described below.

(1) The rotational speed of the cylindrical part A was made at 30 rpm.

(2) A nozzle 16 having an opening the same as the length in the axial direction of the coating surface D shown in FIG. 10 is used.

(3) The coating solution B was coated for 2 seconds from the nozzle 16 to rings on the coating surface D.

Example 4

The same procedure was performed in Example 4 as with Example 1 except the points described below.

(1) The rotational speed of the cylindrical part A was made at 30 rpm.

(2) The coating solution B was coated on the entire surface of the coating surface D from the immersion tank 15A.

Example 5

The same procedure was performed in Example 5 as with Example 1 except the points described below.

(1) The same nozzle as in Example 1 was used to coat the coating solution B linearly in the axial direction of the coating surface D of the cylindrical part A.

(2) Next, the cylindrical part A was rotated and the coating layer C was formed by the coating former 21.

Example 6

The same procedure was performed in Example 6 as with Example 1 except the points described below.

(1) The rotational speed of the cylindrical part A was made at 30 rpm.

(2) The nozzle 16 shown in FIG. 9 comprised of smaller nozzles arranged at five equal points equally arranged in the axial direction of the coating surface D of the cylindrical part A was used.

(3) The coating solution B was coated for 2 seconds in rings on the coating surface D.

Comparative Example 1

Figure 20:
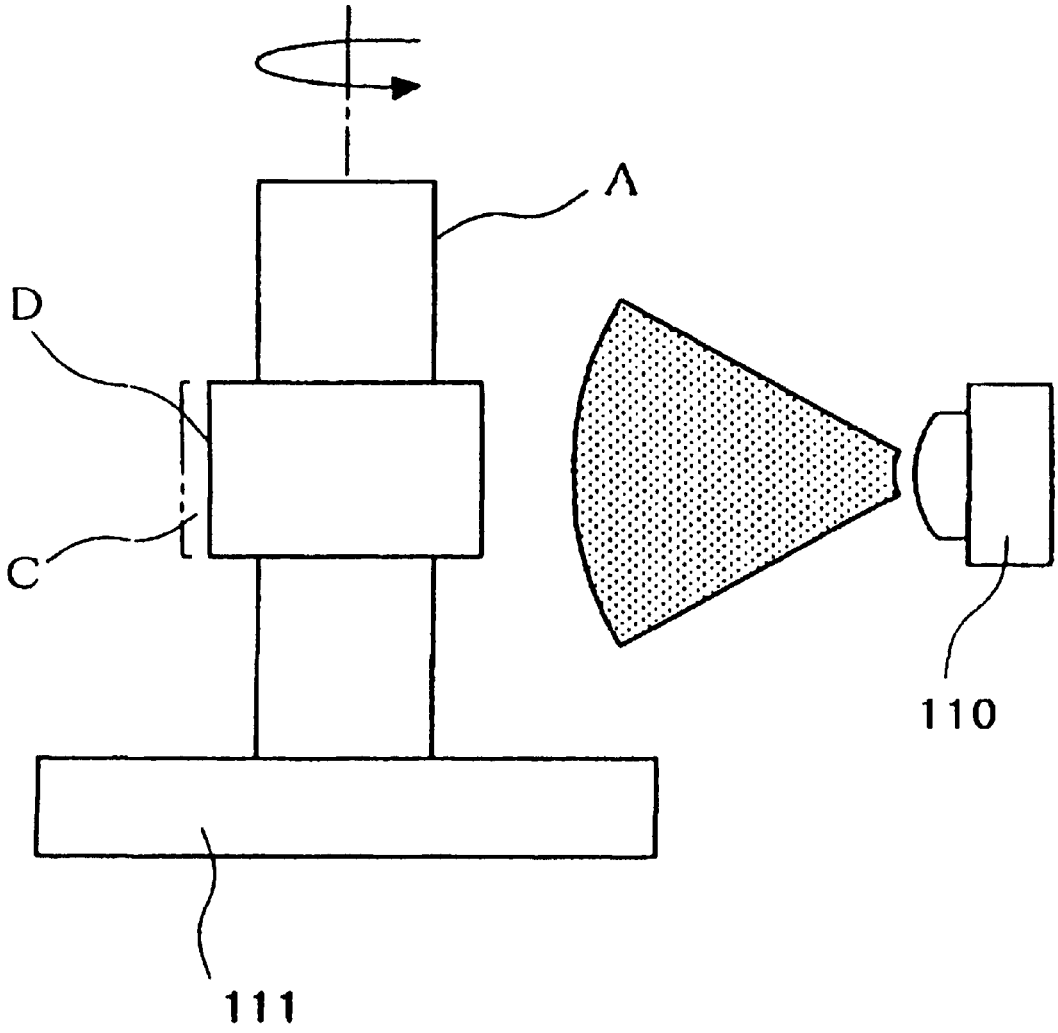
FIG. 20 is a side elevation of a spray coating painter of the present invention.

As shown in FIG. 20, a cylindrical part A was set on a rotation table 111 in a vertical direction. A spraygun 110 was used to coat the same coating solution B as each example on the surface of the coating surface by spray coating. This was then dried and baked under the same conditions as the examples.

Comparative Example 2

The same procedure was followed as in Example 3, except the rotational speed was made 10 rpm and the coating time of the coating solution B from the nozzle 16 was made 6 seconds. The inclined angle of the coating former was made one by which the front end was inclined upward by 45° opposite from Example 3.

Comparative Example 3

The same procedure was performed as in Example 6. Unlike Example 6, however, the excess coating solution of the coating former was not removed.

Results of a comparison of Examples 1 to 6 and Comparative Examples 1 to 6 of the present invention are given in Table 1.

TABLE 1

| | Amount of coating used (per part) | Average film thickness |
|---|---|---|
| Ex. 1 | 0.83 g | 0.052 mm |
| Ex. 2 | 0.83 g | 0.055 mm |
| Ex. 3 | 0.95 g | 0.053 mm |
| Ex. 4 | 1.03 g | 0.050 mm |
| Ex. 5 | 0.96 g | 0.050 mm |
| Comp. Ex. 1 | 5.08 g | 0.053 mm |
| Comp. Ex. 2 | 3.00 g | 0.056 mm |

As clear from Table 1, in the case of the comparative examples, the amount used in the coating of the solution B increased in one coating layer process. Particularly, since the coating for the lubrication use coating layer is expensive, when there are a large number of cylindrical parts A, the cost of the cylindrical part A increases.

Further, comparing Example 6 with Comparative Example 3, where only the removal of the excess coating solution E of the coating former 21 differs, it is observed that when the coating former 21 moves away from the coating surface D, the buildup of the coating surface formed by the excess amount of the coating solution E increases in quantity with progress of the experiments.

TABLE 2

| | Buildup of coating film (mm) | | | | |
|---|---|---|---|---|---|
| | 1st | 2nd | 3rd | 5th | 10th |
| Ex. 6 | 0.02 mm | 0.02 mm | 0.02 mm | 0.02 mm | 0.02 mm |
| Comp. Ex. 3 | 0.02 mm | 0.03 mm | 0.04 mm | 0.06 mm | 0.06 mm |

As explained above, the coating layer forming apparatus of the present invention enables formation of a coating layer to be formed with the minimum amount of the coating solution by setting the coating former at an inclined angle and by the function of the coating removing means, enabling the amount of the expensive coating solution used to be reduced thereby reducing the cost of the part.

According to the present invention, the effect is exhibited of preventing buildup and waviness at the surface of the coating layer and enabling to form a high precision sliding surface.

According to the present invention, the effect can be expected that even if the method of coating of the feeder of the coating solution is simple, the coating layer can be formed well and the device of the feeder can be made at lower cost.

In the coating layer forming apparatus of the present invention, the layer forming device is configured as a rotating layer forming device and the coating removing is device configured to remove the excess amount of the coating solution by the washing tank, so the coating layer can be formed in a short time and the productivity can be improved.

According to the present invention, since the excess amount of the coating solution deposited on the coating former can be continuously removed, high precision surroundings can be formed.

The method of formation of the present invention can reduce the amount of the coating solution used and thereby reduce the cost of the part.

The method of formation of the present invention improves the dimensional accuracy of the outer circumferential surface of the coating layer and facilitates in terms of quality control and enables to improve the precision of formation even in the case of such a hard handling coating solution as solution for a lubrication coating layer.

INDUSTRIAL APPLICABILITY

The coating layer forming apparatus and the method of formation of a coating layer of the present invention can be used for coatings for pistons and various other coatings.

The above embodiments were explained with reference to coating a piston as preferable examples, but the present invention may also be applied to rotatable cylinders, shafts, and other objects.

What is claimed is:

1. A method of forming a coating layer comprising the steps of:

making a cylindrical part rotate at a first speed to coat a coating solution on the surface of said cylindrical part, making said cylindrical part rotate at a second speed higher than said first speed when positioning a front end of a coating former in a predetermined clearance defining the coating formation thickness with the surface of the cylindrical part at an acute inclined angle between the surface plane of the coating former and a rotational tangential direction at the side of the coming surface of said cylindrical part to make a uniform coating solution deposit on the surface of the cylindrical part, and making the cylindrical part rotate at a third speed higher than said second speed when alienating the front end of the coating former from the surface of the cylindrical part and stopping the rotation of said cylindrical part.

2. The method of forming a coating layer as set forth in claim 1, wherein said cylindrical part is made to rotate in a range of 50 to 200 rpm.

3. The method of forming a coating layer as set forth in claim 1, wherein said inclined angle is in a range of 30 to 80 degrees.

4. The method of forming a coating layer as set forth in claim 1, wherein said coating former comprises a layer former and a front end of said layer former facing a rotating surface of said cylindrical part, a surface of said front end with respect to the direction of rotation of said cylindrical part is flat, the front end has a predetermined thickness, and the rear side of the flat surface of the front end is formed cut away in an arc shape.

5. The method of forming a coating layer as set forth in claim 4, wherein said layer former separated by a predetermined distance from said front end of said coating former comprises a part for removing excess coating solution.

6. The method of forming a coating layer as set forth in claim 5, wherein the portion for removing the excess coating is a hole penetrating through the layer former.

7. The method of forming a coating layer as set forth in claim 1, wherein the coating solution has a viscosity of 100 CP to 20,000 CP at a coating temperature of 25° C. and a shear rate of 100 $S^{-1}$.

8. The method of forming a coating layer as set forth in claim 7, wherein the coating solution is formed by an organic base resin of a binder dissolved or dispersed in water or an organic solvent and a PTFE powder, and includes 10 to 100 parts by weight of PTFE powder with respect to 100 parts by weight of the organic base resin of the binder.

9. A coating layer forming apparatus comprising:

a rotating support device having supports for detachably attaching centered between them and rotatably holding two ends of a cylindrical part on which a coating layer is to be formed and a rotation drive for making said cylindrical part supported by the supports rotate;

a coating feeder for coating a coating solution to a surface of the cylindrical part rotating and supported by the rotating support device;

a layer forming device having a coating former, said coating former being inclined at an acute inclined angel between the surface plane of the coating former and a rotational tangential direction at the side of the coming surface of the cylindrical part, and having a front end directed downward and positioned at a predetermined clearance with the surface of the cylindrical part; and a coating removing means for removing the coating solution deposited on the coating former of the layer forming device.

10. The coating layer forming apparatus as set forth in claim 9, wherein the inclined angle of the coating former is in a range of 30 to 80 degrees.

11. The coating layer forming apparatus as set forth in claim 9, wherein said coating former comprises a layer former and a front end of said layer former facing a rotating surface of said cylindrical part, said front end being inclined with respect to a surface of said cylindrical part.

12. The coating layer forming apparatus as set forth in claim 9, wherein said coating former comprises a layer former and a front end of said layer former facing a rotating surface of said cylindrical part, a surface of said front end with respect to a surface of said cylindrical part is flat, the front end has a predetermined thickness, and the rear side of the flat surface of the front end is formed cut away in an arc shape.

13. The coating layer forming apparatus as set forth in claim 11, wherein said layer former separated by a predetermined distance from said front end of said coating former comprises a part for removing excess coating solution constituting said excess coating removing means.

14. The coating layer forming apparatus as set forth in claim 13, wherein the portion for removing the excess coating is a hole penetrating through the layer former.

15. The coating layer forming apparatus as set forth in claim 14, wherein the portion for removing the excess coating comprises holes having inclined surfaces passing through said layer former formed at a plurality of positions of said coating former parallel to the rotating surface of the cylindrical part.

16. The coating layer forming apparatus as set forth in claim 9, wherein said layer former has at least one second coating former positioned at the rear side of said coating former in the direction of rotation, shaped substantially the same as said coating former, inclined at the same angle as the coating former with respect to the tangential direction in the periphery of the cylindrical part, and separated from the surface of the cylindrical part by exactly the same distance as the coating former.

17. The coating layer forming apparatus as set forth in claim 16, wherein said layer former separated by a predetermined distance from said front end of said second coating former comprises a part for removing excess coating solution constituting said excess coating removing means.

18. The coating layer forming apparatus as set forth in claim 17, wherein the portion for removing the excess coating comprises a hole penetrating through the layer former.

19. The coating layer forming apparatus as set forth in claim 17, wherein the portion for removing the excess coating comprises holes having inclined surfaces passing through said layer former formed at a plurality of positions parallel to the rotating surface of the cylindrical part.

20. The coating layer forming apparatus as set forth in claim 9, wherein said layer forming device has a means for adjusting a distance between a front end of said coating former and a surface of said cylindrical part.

21. The coating layer forming apparatus as set forth in claim 9, wherein said rotation drive of said rotary support device makes said cylindrical part rotate in a range of 50 to 200 rpm.

22. The coating layer forming apparatus as set forth in claim 21, wherein said rotation drive increases the rotation speed of said cylindrical part from a lower speed in said range of rotation.

23. The coating layer forming apparatus as set forth in claim 9, wherein said layer former:

separates the front end of the coating former from the surface of the cylindrical part when the coating solution from said coating feeder is coated on the surface of said cylindrical part, makes the front end of said coating former extend to a distance defining a coating layer from the surface of said cylindrical part when a coating is coated on the surface of the cylindrical part, and makes the front end of said coating former separate from the surface of said cylindrical part after the coating layer is formed.

24. The coating layer forming apparatus as set forth in claim 23, wherein said rotation drive of said rotary support device makes said cylindrical part rotate in a range of 50 to 200 rpm and said rotation drive makes said cylindrical part rotate at a low speed equal to or near 50 rpm when a coating solution from said coating feeder is coated on the surface of said cylindrical part, makes said cylindrical part rotate at a speed of a predetermined intermediate degree in said rotation range when the coating solution is coated on the surface of said cylindrical part, and making said cylindrical part rotate at a high speed equal to or near 200 rpm after said coating layer is formed.

25. The coating layer forming apparatus as set forth in claim 9, wherein the coating solution has a viscosity of 100 CP to 20,000 CP at a coating temperature of 25° C. and a shear rate of 100 $S^{-1}$.

26. The coating layer forming apparatus as set forth in claim 25, wherein the coating solution is formed by an organic base resin of a binder dissolved or dispersed in water or an organic solvent and a PTFE powder, and includes 10 to 100 parts by weight of PTFE powder with respect to 100 parts by weight of the organic base resin of the binder.

27. The coating layer forming apparatus comprising:

a rotating support device having supports for detachably attaching centered between them and rotatably holding two ends of a cylindrical part on which a coating layer is to be formed and a rotation drive for making said cylindrical part supported by the supports rotate;

a coating feeder for coating a coating solution to a surface of the cylindrical part rotating and supported by the rotating support device;

a layer forming device having a plurality of coating formers provided along the outer circumference of the rotating support device, each coating former being inclined at an acute angle between the surface plane of the coating former and a rotational tangential direction at the side of the coming surface of said cylindrical part, having a front end positioned at a predetermined clearance from the surface of the cylindrical part, and having a position rotated in a reverse direction as the direction of rotation of the cylindrical part along the circumference of said cylindrical part, and a washing tank provided beneath said layer former and containing a washing solution for washing a coating deposited on a coating former positioned under it among the plurality of coating formers.

28. The coating layer forming apparatus as set forth in claim 27, wherein the inclined angle of each coating former is in a range of 30 to 80 degrees.

29. The coating layer forming apparatus as set forth in claim 28, wherein the rotating layer forming device successively intermittently rotates for each first forming step where the plurality of coating formers form said coating solution into the coating layer.

30. The coating layer forming apparatus as set forth in claim 27, wherein:

a rotational drive of said rotating support device makes said cylindrical part rotate in a range of 50 to 200 rpm and the speed is increased before making the front end of said coating former separate from the coating layer of said cylindrical part.

31. The coating layer forming apparatus as set forth in claim 27, wherein said coating former includes a layer former and a front end of said layer former facing the rotating surface of the cylindrical part and said front end is inclined with respect to the surface of said cylindrical part.

32. The coating layer forming apparatus as set forth in claim 27, wherein said coating former is provided with a layer former and a front end of said layer former facing a rotating surface of said cylindrical part, a surface of said front end with respect to the direction of rotation of said cylindrical part is flat, the front end has a predetermined thickness, and the rear side of the flat surface of the front end is formed cut away in an arc shape.

33. The coating layer forming apparatus as set forth in claim 27, wherein said layer forming device has a means for adjusting a distance between a front end of said coating former and a surface of said cylindrical part.

34. The coating layer forming apparatus as set forth in claim 27, wherein said layer former:

separates the front end of said coating former from the surface of the cylindrical part when the coating solution from the coating feeder is coated on the surface of the cylindrical part, makes the front end of said coating former extend to a distance defining a coating layer from the surface of said cylindrical part when a coating is coated on the surface of the cylindrical part, and makes the front end of said coating former separate from the surface of said cylindrical part after the coating layer is formed.

35. The coating layer forming apparatus as set forth in claim 34, wherein said rotation drive of said rotary support device makes said cylindrical part rotate in a range of 50 to 200 rpm and said rotation drive makes said cylindrical part rotate at a low speed equal to or near 5 rpm when a coating solution from said coating feeder is coated on the surface of said cylindrical part, makes said cylindrical part rotate at a speed of a predetermined intermediate degree in said rotation range when the coating solution is coated on the surface of said cylindrical part, and makes said cylindrical part rotate at a high speed equal to or near 50 rpm after said coating layer is formed.

36. The coating layer forming apparatus as set forth in claim 27, wherein the coating solution has a viscosity of 100 CP to 20,000 CP at a coating temperature of 25° C. and a shear rate of 100 $S^{-1}$.

37. The coating layer forming apparatus as set forth in claim 36, wherein the coating solution is formed by an organic base resin of a binder dissolved or dispersed in water or an organic solvent and a PTFE powder, and includes 10 to 100 parts by weight of PTFE powder with respect to 100 parts by weight of the organic base resin of the binder.

*38. A method of forming a coating layer on a cylindrical member, said method comprising:*

*a first step of making a cylindrical member rotate at least one rotation at a first speed, and evenly coating only a coating solution on a surface of the cylindrical member using a coating former from a position spaced apart by a predetermined gap clearance defining a coating formation thickness with respect to the surface of the cylindrical member to form a layer of the coating solution on the surface of the cylindrical member; and*

*a second step of making the cylindrical member rotate at a second speed higher than the first speed, and moving the coating former apart from the surface of the layer coated on the surface of the cylindrical member, after having rotated the cylindrical member at least one rotation at the first speed.*

*39. The method of forming a coating layer as set forth in claim 38, wherein in the first step, a direction of front end tip of the coating former is inclined at an acute angle between 20 and 80 degrees to a rotational tangential direction of the cylindrical member.*

*40. A method of forming a coating layer on a cylindrical member, said method comprising:*

*approaching a tip of a coating former to a surface of a cylindrical member at a predetermined gap clearance defining a coating formation thickness;*

*making a cylindrical member rotate at least one rotation at a first speed, and evenly coating only a coating solution on a surface of the cylindrical member by using the coating former from a position spaced apart by the predetermined gap clearance defining a coating formation thickness with respect to the surface of the cylindrical member to form a layer of the coating solution on the surface of the cylindrical member; and*

*making the cylindrical member rotate at a second speed higher than the first speed, and moving the coating former apart from the surface of the layer coated on the surface of the cylindrical member, after having rotated the cylindrical member at least one rotation at the first speed.*

*41. The method of forming a coating layer as set forth in claim 40, further comprising inclining a direction of the tip of the coating former at an acute angle between 20 and 80 degrees to a rotational tangential direction of the cylindrical member.*

*42. A coating layer forming apparatus comprising:*

*a rotating device for rotating a cylindrical member on which a coating layer is to be formed at a first rotation speed for at least one rotation and rotating the cylindrical member at a second rotation speed higher than the first rotation speed; and*

*a layer forming device having a coating former, the layer forming device positioning a tip of the coating former at a surface of the cylindrical member spaced apart by a predetermined gap clearance defining a coating formation thickness while the cylindrical member is rotated at least one rotation at the first rotation speed by the rotating device, and the layer forming device moving the tip of the coating former apart from the surface of the layer of the coating solution formed on the surface of the cylindrical member while the cylindrical member is rotated at the second speed after having rotated the cylindrical member at the first speed.*

*43. The coating layer forming apparatus as set forth in claim 42, wherein a direction of the tip of the coating former is inclined at an acute angle between 20 and 80 degrees to a rotational tangential direction of the cylindrical member.*

* * * * *